United States Patent
Kim

(10) Patent No.: US 10,912,020 B2
(45) Date of Patent: Feb. 2, 2021

(54) METHOD AND APPARATUS FOR CONTROLLING ACCESS OF TERMINAL EQUIPMENT IN WIRELESS COMMUNICATION SYSTEM

(71) Applicant: ELECTRONICS AND TELECOMMUNICATIONS RESEARCH INSTITUTE, Daejeon (KR)

(72) Inventor: Jae Heung Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/373,331

(22) Filed: Apr. 2, 2019

(65) Prior Publication Data

US 2019/0230588 A1 Jul. 25, 2019

Related U.S. Application Data

(63) Continuation of application No. 15/349,469, filed on Nov. 11, 2016, now abandoned.

(30) Foreign Application Priority Data

Nov. 17, 2015 (KR) .................. 10-2015-0161394
Nov. 25, 2015 (KR) .................. 10-2015-0165745

(Continued)

(51) Int. Cl.
*H04W 4/00* (2018.01)
*H04W 48/20* (2009.01)

(Continued)

(52) U.S. Cl.
CPC .......... *H04W 48/20* (2013.01); *H04W 72/042* (2013.01); *H04W 76/19* (2018.02)

(58) Field of Classification Search
CPC .... H04W 48/20; H04W 76/19; H04W 72/042
See application file for complete search history.

(56) References Cited

U.S. PATENT DOCUMENTS 8,265,007 B2 * 9/2012 Lee .................. H04W 72/005
370/328
9,185,612 B2 11/2015 Xu et al.
(Continued)

FOREIGN PATENT DOCUMENTS

JP 2007-251644 A 9/2007
KR 10-2014-0009508 A 1/2014
(Continued)

OTHER PUBLICATIONS

R2-156505, Email discussion—[91 bis#36][LTE/V2X] Latency analysis, 3GPP TSG-RAN WG2 #92, Nov. 16-20, 2015.

*Primary Examiner* — Abdelnabi O Musa
(74) *Attorney, Agent, or Firm* — Rabin & Berdo, P.C.

(57) ABSTRACT

A serving cell performs a connection establishment procedure with terminal equipment, stores the connection configuration information of the terminal equipment, and maintains the connection configuration information of the terminal equipment transited to an idle state depending on a set information maintaining condition. Further, the serving cell provides a service to the terminal equipment using the connection configuration information of the terminal equipment without the connection establishment procedure when the terminal equipment in the idle state tries a re-access.

16 Claims, 8 Drawing Sheets

(30) Foreign Application Priority Data

| Date | | |
|---|---|---|
| Dec. 15, 2015 | (KR) | 10-2015-0179447 |
| Jan. 7, 2016 | (KR) | 10-2016-0002072 |
| Jun. 8, 2016 | (KR) | 10-2016-0071273 |
| Jul. 7, 2016 | (KR) | 10-2016-0086155 |
| Jul. 11, 2016 | (KR) | 10-2016-0087268 |
| Aug. 2, 2016 | (KR) | 10-2016-0098500 |
| Aug. 8, 2016 | (KR) | 10-2016-0100908 |
| Nov. 7, 2016 | (KR) | 10-2016-0147737 |

(51) Int. Cl.
*H04W 76/19* (2018.01)
*H04W 72/04* (2009.01)

(56) References Cited

U.S. PATENT DOCUMENTS

| | | |
|---|---|---|
| 9,386,442 B2 | 7/2016 | Xu et al. |
| 2010/0142485 A1 | 6/2010 | Lee et al. |
| 2012/0002643 A1 | 1/2012 | Chung et al. |
| 2012/0142354 A1 | 6/2012 | Ahluwalia |
| 2013/0303081 A1* | 11/2013 | Chang ............... H04W 36/0061 455/11.1 |
| 2014/0162652 A1 | 6/2014 | Kang et al. |
| 2015/0038148 A1 | 2/2015 | Park et al. |
| 2015/0223284 A1 | 8/2015 | Jain et al. |
| 2015/0318973 A1* | 11/2015 | Wang .................... H04L 5/0051 370/329 |
| 2016/0057612 A1 | 2/2016 | Xu et al. |
| 2016/0165638 A1* | 6/2016 | Ozturk .................. H04W 68/02 370/329 |
| 2016/0353308 A1* | 12/2016 | Kim ...................... H04W 24/10 |
| 2016/0353361 A1* | 12/2016 | Jung ..................... H04W 48/12 |
| 2017/0041841 A1 | 2/2017 | Pedersen et al. |
| 2017/0150405 A1 | 5/2017 | Chiba et al. |
| 2017/0311233 A1* | 10/2017 | Du ........................ H04W 48/10 |

FOREIGN PATENT DOCUMENTS

| | | |
|---|---|---|
| KR | 10-2014-0123262 A | 10/2014 |
| KR | 10-2015-0040989 A | 4/2015 |
| KR | 10-2015-0119525 A | 10/2015 |
| KR | 10-2016-0008868 A | 1/2016 |

* cited by examiner

METHOD AND APPARATUS FOR CONTROLLING ACCESS OF TERMINAL EQUIPMENT IN WIRELESS COMMUNICATION SYSTEM

CROSS-REFERENCE TO RELATED APPLICATION

This application is a continuation of U.S. application Ser. No. 15/349,469, filed on Nov. 11, 2016, which claims priority to and the benefit of Korean Patent Application Nos. 10-2015-0161394, 10-2015-0165745, 10-2015-0179447, 10-2016-0002072, 10-2016-0071273, 10-2016-0086155, 10-2016-0087268, 10-2016-0098500, 10-2016-0100908, and 10-201 6-01 47737 filed in the Korean Intellectual Property Office on Nov. 17, 2015, Nov. 25, 2015, Dec. 15, 2015, Jan. 7, 2016, Jun. 8, 2016, Jul. 7 2016, Jul. 11, 2016, Aug. 2, 2016, Aug. 8, 2016, and Nov. 7, 2016, the entire contents of which are incorporated herein by reference.

BACKGROUND OF THE INVENTION

(a) Field of the Invention

The present invention relates to a method and an apparatus for controlling an access of terminal equipment in a wireless communication system, and more particularly, a method and a procedure for reducing latency in a mobility control and an access procedure of terminal equipment moving along a path.

(b) Description of the Related Art

A route setting and a control for terminal equipment deployed in moving objects or terminal equipment in moving objects traveling along a specific path such as a self-driving car traveling on a road, a train moving on a track, or unmanned aerial vehicles (or unmanned vehicles) like a drone moving along the specific path that are based on a mobile communication system are operated based on location information like a global positioning system (GPS). However, a centralized routing control technology based on an infrastructure network like the mobile communication system has been required to perform a control of approach prohibition or restriction area and a required path control depending on various application services.

Further, to transit the terminal equipment in an idle state in the mobile communication system to a connected state in which a packet data can be transmitted, the terminal equipment needs to exchange a basic control message for connection establishment with a base station, and therefore latency occurs. Even when a radio frame structure having a short transmission time interval (TTI), a short scheduling period, or a short subframe is applied, the basic latency may no be avoided due to the connection establishment.

SUMMARY OF THE INVENTION

The present invention has been made in an effort to provide a method and an apparatus for controlling an access of terminal equipment in a wireless communication system having advantages of improving efficiency of a system by reducing latency in a mobility control and a wireless section access procedure of terminal equipment.

An exemplary embodiment of the present invention provides a method for controlling an access of terminal equipment in a serving cell. The method for controlling an access of terminal equipment in a serving cell includes: performing a connection establishment procedure with the terminal equipment and storing connection configuration information of the terminal equipment; maintaining the connection configuration information of the terminal equipment transited to an idle state depending on a set information maintaining condition; and providing a service to the terminal equipment using the connection configuration information of the terminal equipment without the connection establishment procedure when the terminal equipment in the idle state tries a re-access.

The information maintaining condition may include at least one of: a first condition corresponding to a set timer expiration time; a second condition in a continuously set area after the terminal equipment is transited to the idle state; and a third condition in which a quality of received signal of the terminal equipment corresponds to a set reference value or more, while satisfying the second condition.

The method may further include: estimating a predicted path of the terminal equipment; and transmitting the connection configuration information of the terminal equipment to a target cell before the terminal equipment enters the target cell.

The method may further: determining a cell change of the terminal equipment based on a measurement result from the terminal equipment transited to the idle state; and performing a cell change procedure for the terminal equipment.

The performing of the cell change procedure may include: transmitting a cell change request including the information of the terminal equipment to the target cell; transmitting a first cell change notification control message to the target cell when the target cell permits the access of the terminal equipment; and transmitting a control message for serial number (SN) status information transmission or data forwarding to the target cell.

The performing of the cell change procedure may further include transmitting a second cell change notification control message including the information of the target cell using an indicator notifying the cell change to the terminal equipment or a scheduling identifier.

The cell change request may further include information on predicted time when the terminal enters a service area of the target cell and information on time when control authority for the terminal equipment is handed over to the target cell.

The method may further include: allocating a common radio resource to other base stations within the area, in the case of the set area; and transmitting the common information to the terminal equipment using the common radio resource when the terminal equipment enters in the area. The common information may include at least one of system information, physical layer channel configuration and allocation information, common control information, radio resource allocation information for a control channel, resource information for access procedure performance, or configuration information of a resource for resource request procedure performance, downlink transmission request resource information, reference signal configuration and allocation information, radio source information for device-to-device communication, and radio resource information for transmitting a control signal for device-to-device communication and the common information further includes an identifier for identifying the area.

The method may further include: controlling the terminal equipment to perform at least one of cell registration, location update, and measurement result report when the terminal equipment in the idle state satisfies a predetermined condition during movement to the target cell.

The predetermined condition may include at least one of: a first condition in which the number of nodes passing during the movement meets the number of preset nodes; a second condition satisfying a preset timer value; a third condition moving a preset distance; a fourth condition changing a progress direction; a fifth condition to enter a cell designated to perform at least one of the cell registration, the location update, and the measurement result report; and a sixth condition satisfying a selective combination of the first to fifth conditions.

The method may further include: receiving a cell change notification control message including the information of the terminal equipment from a target cell when the terminal equipment transited to the idle state determines a cell change to the target cell; and transmitting at least one of connection configuration information, moving status information, and providing service information of the terminal equipment.

The method may further include: deleting the connection configuration information of the terminal equipment when a handover procedure of the terminal equipment to a target cell is completed.

The method may further include: deleting connection configuration information of the terminal equipment when a defined time lapses.

Another embodiment of the present invention provides an apparatus for controlling an access of terminal equipment. The apparatus for controlling an access of terminal equipment may include a transmitting/receiving apparatus, a storage device, and a processor. The transmitting/receiving apparatus may be connected to a network to perform communication. The storage device may store connection configuration information of the terminal equipment. The processor may perform a connection establishment procedure with the terminal equipment to provide a service to the terminal equipment, maintain the connection configuration information of the terminal equipment transited to an idle state depending on an information maintaining condition, and provide the information of the terminal equipment including the connection configuration information to a target cell through the transmitting and receiving apparatus when a cell change of the terminal equipment is determined depending on a cell change condition.

The information maintaining condition may include at least one of: a first condition corresponding to a set timer expiration time; a second condition in a continuously set area after the terminal equipment is transited to the idle state, and a third condition in which a quality of received signal of the terminal equipment corresponds to a set reference value or more, while satisfying the second condition.

The processor may determine the cell change of the terminal equipment based on measurement result information from the terminal equipment and notify the terminal equipment of the cell change including information of the target cell through the transmitting/receiving apparatus.

When the area is set, the processor may allocate a common radio resources to other base stations within the set area and transmit common information to terminal equipment within the area through the transmitting and receiving apparatus using the common radio resource, and the common information may include at least one of system information, physical layer channel configuration and allocation information, common control information, radio resource allocation information for a control channel, resource information for access procedure performance, or configuration information of a resource for resource request procedure performance, downlink transmission request resource information, reference signal configuration and allocation information, radio source information for device-to-device communication, and radio resource information for a control signal for device-to-device communication and the common information further includes an identifier for identifying the area.

The processor may control the terminal equipment to perform at least one of cell registration, location update, and measurement result report when the terminal equipment in the idle state satisfies a predetermined condition during movement and the predetermined condition may include at least one of: a first condition in which the number of nodes passing during the movement meets the number of preset nodes; a second condition satisfying a preset timer value; a third condition moving a preset distance; a fourth condition changing a progress direction; a fifth condition to enter a cell designated to perform at least one of the cell registration, the location update, and the measurement result report; and a sixth condition satisfying a selective combination of the first to fifth conditions.

Yet another exemplary embodiment of the present invention provides a method for controlling an access of terminal equipment. The method for controlling an access in terminal equipment includes: establishing a connection with a serving cell and then transiting to an idle state; performing a cell change procedure when a cell change to a target cell depending on a cell change condition is determined; and performing at least one of cell registration, location update, and measurement result report when the terminal equipment in the idle state satisfies a predetermined condition during movement, in which the predetermined condition may include at least one of: a first condition in which the number of nodes passing during the movement meets the number of preset nodes; a second condition satisfying a preset timer value; a third condition moving a preset distance; a fourth condition changing a progress direction; a fifth condition to enter a cell designated to perform at least one of the cell registration, the location update, and the measurement result report; and a sixth condition satisfying a selective combination of the first to fifth conditions.

The performing of the cell change procedure may include: determining a cell change to the target cell; trying an access to the target cell while transmitting the information of the serving cell and the information of the terminal equipment to the target cell; and transmitting, by the serving cell receiving a cell change notification control message from the target cell, connection configuration information of the terminal equipment to the target cell.

DETAILED DESCRIPTION OF THE EMBODIMENTS

Figure 1:
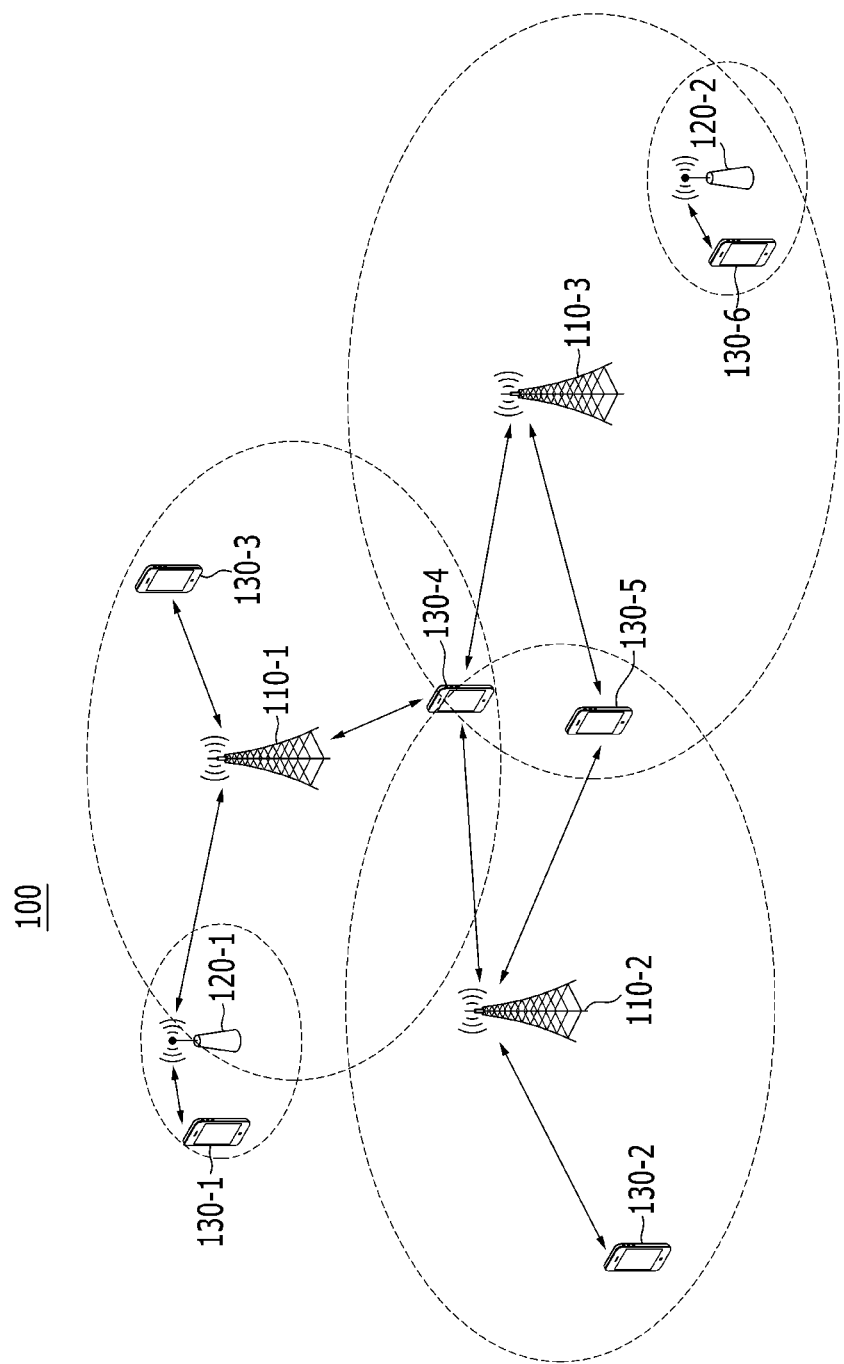
FIG. 1 is a diagram illustrating an example of a wireless communication network according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification and claims, unless explicitly described to the contrary, "comprising" any components will be understood to imply the inclusion of other elements rather than the exclusion of any other elements. Further, the terms "first", "second", etc. may be used to describe various components but the components are not limited to the terms "first", "second", etc. The terms "first", "second", etc. are used to distinguish one component from another component. For example, a first component may be named a second component without deviating from the scope of the present invention and similarly, the second component may also be named the first component. The term "and/or" includes a combination of a plurality of relevant items or any of a plurality of relevant items.

Throughout the specification, terminal equipment may refer to a mobile terminal (MT), a mobile station (MS), an advanced mobile station (AMS), a high reliability mobile station (HR-MS), a subscriber station (SS), a portable subscriber station (PSS), an access terminal (AT), user equipment (UE), a device, an Internet of thing (IoT) device, a mounted module/device/terminal or an on board device/terminal, and the like and may also include all or some of the functions of the MT, the MS, the AMS, the HR-MS, the SS, the PSS, the AT, the UE, the Iot device, the mounted module/device/terminal or the on board device/terminal, and the like.

Further, a base station (BS) may refer to an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (RS) serving as a base station, a high reliability relay station (HR-RS) serving as a base station, small base stations (a femto base station (femoto BS), a home node B (HNB), a home eNodeB (HeNB), a pico base station (pico BS), a metro base station (metro BS), a micro base station (micro BS), and the like), a road side unit (RSU), a radio remote head (RRH), a transmission point (TP), a transmission and reception point (TRP), and the like and may also include all or some of the functions of the ABS, the HR-BS, the node B, the eNodeB, the AP, the RAS, the BTS, the MMR-BS, the RS, the RN, the ARS, the HR-RS, the small base stations, the RSU, the RRH, the TP, and the TRP, and the like.

Hereinafter, a method and an apparatus for controlling an access of terminal equipment in a wireless communication system according to an exemplary embodiment of the present invention will be described in detail with the accompanying drawings.

First, a wireless communication network according to an exemplary embodiment of the present invention will be described. The wireless communication network according to an exemplary embodiment of the present invention is not limited to the following description, and the exemplary embodiments of the present invention may be applied to various wireless communication networks. Here, the wireless communication network may be used as the same meaning as a wireless communication system.

FIG. 1 is a diagram illustrating an example of a wireless communication network according to an exemplary embodiment of the present invention.

Referring to FIG. 1, a wireless communication network 100 may be configured of a plurality of communication nodes 110-1, 110-2, 110-3, 120-1, 120-2, 130-1, 130-2, 130-3, 130-4, 130-5, and 130-6. The plurality of communication nodes 110-1, 110-2, 110-3, 120-1, 120-2, 130-1, 130-2, 130-3, 130-4, 130-5, and 130-6 may each support at least one communication protocol. For example, the plurality of communication nodes 110-1, 110-2, 110-3, 120-1, 120-2, 130-1, 130-2, 130-3, 130-4, 130-5, and 130-6 may each support code division multiple access (CDMA)-based communication protocol, wideband CDMA (WCDMA)-based communication protocol, time division multiple access (TDMA)-based communication protocol, frequency division multiple access (FDMA)-based communication protocol, orthogonal frequency division multiplexing (OFDM)-based communication protocol, orthogonal frequency division multiple access (OFDMA)-based communication protocol, single carrier (SC)-FDMA-based communication protocol, non-orthogonal multiple access (NOMA)-based communication protocol, space division multiple access (SDMA)-based communication protocol, a radio access technology (RAT)-based communication protocol for multiple access based on a beamforming technique using a massive antenna to support, and the like. The plurality of communication nodes 110-1, 110-2, 110-3, 120-1, 120-2, 130-1, 130-2, 130-3, 130-4, 130-5, and 130-6 may each have a structure as illustrated in FIG. 2.

Figure 2:
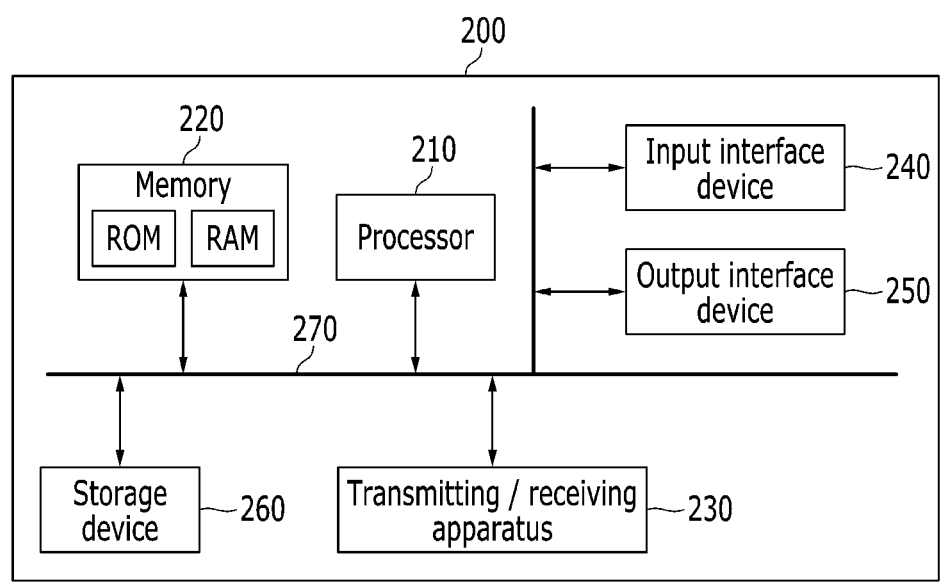
FIG. 2 is a diagram illustrating a communication node configuring a wireless communication network illustrated in FIG. 1.

FIG. 2 is a diagram illustrating a communication node configuring a wireless communication network illustrated in FIG. 1.

Referring to FIG. 2, a communication node 200 may include at least one processor 210, a memory 220, and a transmitting/receiving apparatus 230 connected to a network to perform communications. Further, the communication node 200 may further include an input interface device 240, an output interface device 250, a storage device 260, or the like. Each of the components included in the communication node 200 may be connected to each other by a bus 270 to communication with each other.

The processor 210 may run a program command that is stored in at least one of the memory 220 and the storage device 260. The processor 210 may mean a central processing unit (CPU), a graphics processing unit (GPU), or an exclusive process that performs method according to exemplary embodiments of the present invention. The memory 220 and the storage device 260 may each be configured of at least one of a volatile storage medium and a non-volatile storage medium. For example, the memory 220 may be configured of at least one of a read only memory (ROM) and a random access memory (RAM).

Referring back to FIG. 1, communication nodes 110-1, 110-2, 110-3, 120-1, and 120-2 may be a base station and communication nodes 130-1, 130-2, 130-3, 130-4, 130-5, and 130-6 may be user equipment (UE). Hereinafter, for convenience of explanation, the communication nodes 110-1, 110-2, 110-3, 120-1, and 120-2 are each named first to fifth base stations and the communication nodes 130-1, 130-2, 130-3, 130-4, 130-5, and 130-6 are each named first to sixth UEs.

The first base station 110-1, the second base station 110-2, and the third base station 110-3 may each form a macro cell. The fourth base station 120-1 and the fifth base station 120-2 may each form a small cell. The fourth base station 120-1, the third UE 130-3, and the fourth UE 130-4 may belong to a cell coverage of the first base station 110-1. The second UE 130-2, the fourth UE 130-4, and the fifth UE 130-5 may belong to a cell coverage of the second base station 110-2. The fifth base station 120-2, the fourth UE 130-4, the fifth UE 130-5, and the sixth UE 130-6 may belong to a cell coverage of the third base station 110-3. The first UE 130-1 may belong to the cell coverage of the fourth base station 120-1. The sixth UE 130-6 may belong to the cell coverage of the fifth base station 120-2.

The first to fifth base stations 110-1, 110-2, 110-3, 120-1, and 120-2 and the first to sixth UEs 130-1, 130-2, 130-3, 130-4, 130-5, and 130-6 may each support cellular communications (for example, long term evolution, LTE-advanced (LTE-A), and the like defined in the 3rd generation partnership project (3GPP) standard). The first to fifth base stations 110-1, 110-2, 110-3, 120-1, and 120-2 each may be operated in different frequency bands or the same frequency band. The first to fifth base stations 110-1, 110-2, 110-3, 120-1, and 120-2 may each be connected to each other through ideal backhaul or non-ideal backhaul and may exchange information with each other through the ideal backhaul or the non-ideal backhaul. The first to fifth base stations 110-1, 110-2, 110-3, 120-1, 120-2 may each be connected to a core network (not illustrated) through the ideal backhaul or the non-ideal backhaul. The first to fifth base stations 110-1, 110-2, 110-3, 120-1, and 120-2 may each transmit a signal received from the core network to the corresponding UEs 130-1, 130-2, 130-3, 130-4, 130-5, and 130-6 and may transmit a signal received from the corresponding UEs 130-1, 130-2, 130-3, 130-4, 130-5, and 130-6 to the core network.

The first to fifth base stations 110-1, 110-2, 110-3, 120-1, and 120-2 may each support an OFDMA-based downlink transmission and an SC-FDMA-based uplink transmission. Further, the first to fifth base stations 110-1, 110-2, 110-3, 120-1, and 120-2 may each support multiple input multiple output (MIMO) transmission [for example, single user (SU)-MIMO, multi user (MU)-MIMO, massive MIMO, and the like], coordinated multipoint (CoMP) transmission, carrier aggregation (CA) transmission, transmission in an unlicensed band, device to device (D2D) communication [or proximity services (ProSe)], or the like. Here, the first to sixth UEs 130-1, 130-2, 130-3, 130-4, 130-5, and 130-6 may each perform operations corresponding to the base stations 110-1, 110-2, 110-3, 120-1, and 120-2 and operations supported by the base station 110-1, 110-2, 110-3, 120-1, and 120-2.

For example, the second base station 110-2 may transmit a signal to the fourth UE 130-4 based on the SU-MIMO scheme and the fourth UE 130-4 may receive a signal from the second base station 110-2 based on the SU-MIMO scheme. Alternatively, the second base station 110-2 may transmit a signal to the fourth UE 130-4 and the fifth UE 130-5 based on the MU-MIMO scheme and the fourth UE 130-4 and the fifth UE 130-5 may each receive a signal from the second base station 110-2 based on the MU-MIMO scheme. The first base station 110-1, the second base station 110-2, and the third base station 110-3 may each transmit a signal to the fourth UE 130-4 based on the CoMP scheme and the fourth UE 130-4 may receive a signal from the first base station 110-1, the second base station 110-2, and the third base station 110-3 based on the CoMP scheme. The plurality of base stations 110-1, 110-2, 110-3, 120-1, and 120-2 may each transmit/receive a signal to and from the UEs 130-1, 130-2, 130-3, 130-4, 130-5, and 130-6 belonging to their own cell coverage based on the CA scheme. The first base station 110-1, the second base station 110-2, and the third base station 110-3 may each coordinate the D2D between the fourth UE 130-4 and the fifth UE 130-5 and the fourth UE 130-4 and the fifth UE 130-5 may each perform the D2D by the coordination of each of the second base station 110-2 and the third base station 110-3.

A method for a mobility control and an access control for terminal equipment deployed in a moving object based on a wireless communication network will be described. The terminal equipment deployed in the moving object may mean the user equipment in the moving object. The terminal equipment may correspond to the UE illustrated in FIG. 1. When the operation of the terminal equipment is described, the base station corresponding thereto may perform an operation corresponding to the operation of the terminal equipment. On the contrary, when the operation of the base station is described, the terminal equipment corresponding thereto may perform an operation corresponding to the operation of the base station.

<Path Control of Moving Object>

Moving objects such as an unmanned aerial vehicle, a self-driving car, or a car that is traveling using a navigation function move along a set path. For example, the unmanned aerial vehicle flies a flight possible area at a set altitude and speed. Further, the unmanned aerial vehicle flies along a preset path of flight from a source to a destination.

Further, the self-driving car or the car that is traveling using the navigation function drives along a set traveling path from a source to a destination depending on a traffic flow of the corresponding road or the road environment (or attribute). Here, the road environment (or attribute) means information on a lane width, the number of lanes, or a kind of roads (city road, main road, backside road, motorway, expressway, or the like)

As such, the moving object moving along a preset path from one point to another point generally moves using location information like GPS and positioning information using an embedded sensor or an internal positioning function. When there is no control for a centralized moving path, it is difficult to change a path to correspond to a change in various (or emergency/urgent) situations on a path or efficiently control the entry of the corresponding moving object into an approach restriction (or prohibition) area.

However, if an infrastructure system configuring a network like a mobile communication system is used, it is possible to efficiently control a path for a moving object. For example, the moving object uses a radio interface with end nodes [for example, base station (or cell), relay, access point (AP), remote radio head (RRH), road side unit (RSU), and the like] of a mobile communication system or a radio interface for D2D communication [for example, device-to-device (D2D) or vehicle-to-everything (V2X) function of a 3GPP LTE/LTE-A system] to report information on its own source, a current location, a halfway stop, or a final destination to the end node. For convenience of explanation, it is assumed that the end node is the base node. In this case, the information on each point means information such as geographical location information, attributes of the corresponding point, and mobile communication cell information of the corresponding point. Here, the geographical location information may be information such as longitude and latitude information (GPS information), altitude information, road and house number, and address. Further, the attribution information of the corresponding point may be information representing geographical features of the corresponding point such as a structure of building, a road, an open space, a residential street, a shopping district, a bridge, seashore, a forest, a river, or the like and may include additional information such as a size, a height and an area. Further, the mobile communication cell information of the corresponding point may be a physical layer identifier [for example, physical cell ID (PCI)] of the corresponding cell, a unique identifier [for example, global cell ID (GCI)] in a system, geographical location information, or the like.

The base station receiving the information on the source, current location, halfway stop, or final destination of the corresponding moving object that the moving object reports may check the location information on the halfway stop or the final destination to transfer the location information of the moving object to a cell (point) on a path and manage it. In particular, in the case of vehicles, the base station may control a path in a unit of a crossroad on a path, an entering and exiting point of a road, a junction or a joining point of a path.

For the path control, the base station transfers the received information on the source, current location, halfway stop, or final destination of the corresponding moving object to a central server or a control system that manages the corresponding moving object.

In particular, for the control of the moving path of the moving object, when the moving object starts to move or drive, a communication network connection is preferentially performed. The communication network connection means information exchange by making logical connection establishment with a system for controlling a moving path or a network related function node (or server) based on the mobile communication system or other communication systems. By the communication network connection, the system for controlling a moving path or the network related function node may set a next destination (base station/cell) in consideration of the final destination and control a moving object to move to the next destination. That is, when the moving object moves on the path, the moving object may move along next halfway destinations (or stops) designated by an infrastructure system established in a base station (or cell) service area unit to reach the final destination. Here, setting the next halfway destinations (or stops) in the base station (or cell) service area unit may mean changing a subject of a connection control or radio resource management (or allocation) for communication with terminal equipment of the corresponding moving object in a base station (or cell) unit.

As such, if the halfway destinations (or stops) are set in the base station (or cell) service area unit to control a path of the moving object, when the moving object moves to the set destination, it is possible to change a path to correspond to a change in various (or emergency/urgent) situations on a path or efficiently control the entry of the corresponding moving object into an approach restriction (or prohibition) area.

For example, the system for controlling a moving path changes next halfway destinations (or stops) to correspond to climate change, road repairing, facilities, or a change in other various situations on a path from a first set source to a destination to set an optimal path and may control a moving object to move along the set optimal path. Further, when there is the approach restriction area of the corresponding moving object on the set moving path and the control system that manages the path of the corresponding moving object is required, the system for controlling a moving path may control the moving object to change its own path to bypass the specific area, if necessary.

The path control for the moving object by the end node of the above-mentioned mobile communication system means a path control for at least one of location information of GPS, or the like of a next halfway destination (or stop) to which the terminal equipment deployed in the corresponding moving object will move, a moving speed, and a moving path [altitude, GPS coordinate, track, (entering and exiting) road, junctions or joining points of all paths, or the like] to the next halfway destination (or stop).

Further, the base station may change the path of the terminal equipment as well as control the mobility of the terminal equipment on the moving path such as the moving speed, the altitude (height), the traveling road, or the like. For example, the base station may instruct (set) the terminal equipment to be a specific moving speed or a moving speed of a predetermined range value, to thereby control the terminal equipment to move. Similarly, an inside lane or a kind of roads to be used upon movement (e.g., a lane width, main road, local road, expressway, motorway, or the like) may be designated in the terminal equipment moving along a road. Further, the base station may instruct an unmanned aerial vehicle on an altitude (or allowable range of altitude) on a flight path, thereby controlling the unmanned aerial vehicle to move.

In the path control for the moving object, when the information on the final destination is not clear or the moving object or the terminal equipment is not authorized, the system for controlling a moving path may not perform the path control procedure on the moving object or the terminal equipment that does not acquire a valid authentication procedure or valid information. In this case, the system for controlling a moving path may transfer the corresponding information to a control node or a related control system of a mobile communication network (or related system) to control the corresponding moving object to stop moving on the moving path.

In particular, flying objects such as the unmanned aerial vehicle (or drone) may exchange attributes, moving path information, or the like of moving objects with each other by a device-to device communication function between the corresponding flying moving objects to avoid a collision or perform a location control for group flight.

Further, a moving object operated with a battery may transfer information on a state of charge of the battery to the base station or a communication apparatus deployed at a charging location located on a path to determine a battery charging location or time, thereby performing a battery charging procedure. Here, the moving object operated with the battery means a moving object controlled by a person or an unmanned moving object that does not have a passenger or is not directly controlled by a person but moves along a set path or by a self-driving function.

For example, when remaining time (or charging percentage value) of a battery is equal to or less than a preset reference value, the moving object operated with the battery may be set to transmit the information [for example, estimated remaining time (or charging percentage information) of a battery or battery replacement request]. Therefore, the moving object of which the battery needs to be charged may compare the remaining time (or charging percentage value) of the battery with the preset reference value while moving to transmit the estimated remaining time (or charging percentage information) of the battery or a battery charging request message or report a state of charge of the battery, when necessary (or when meeting a transmission condition). The base station receiving the battery charging request message or the charging state report sets the optimal charging location located on the moving path as the next halfway destination to control the corresponding moving object to charge its own battery. Further, the communication apparatus deployed at the charging location receiving the battery charging request message or the charging state report may transmit information such as information on whether to charge the battery, standby time required for charging, and location information of the charging location to the corresponding moving object. The information on whether to charge the battery, the standby time required for charging, and the location information of the charging location, or the like that are transmitted by the communication apparatus deployed at the charging location may also be transmitted in a broadcast or multicast to be received by surrounding moving objects, independent of the transmission of the charging request message of the moving object.

<Access Control of Moving Object>

A process of setting a logical channel through which the terminal equipment transmits/receives packet data to/from the base station in the mobile communication system is called a connection establishment procedure. As such, the state in which the connection between the base station and the terminal equipment may be established to transmit/receive the packet data is a connected state [for example, (RRC) connected state of the LTE system]. Further, the state that is not the connected state is called an idle state [For example, (RRC) idle state of the LTE system]. Further, the packet data or the common control information [for example, system information] of a service provided in a broadcast or multicast scheme may be received even in the idle state in which the connection is not established. Further, the packet data may be transmitted/received between the terminal equipments according to the D2D scheme without the connection establishment with the base station.

For the terminal equipment of the connected state as described above, the base station stores and manages the connection configuration information [for example, RRC context or access stratum (AS) configuration information of the LTE system] on the corresponding terminal equipment. Therefore, when the terminal equipment is transited from the connected state to the idle state, the base station deletes the connection configuration information on the corresponding terminal equipment and does not manage the information on the corresponding terminal equipment. Here, the connection configuration information on the terminal equipment that is stored and managed by the base station means information required to maintain the connection between the base station and the terminal equipment and provide a service such as mobility related information [source cell and target cell information (information of cell identifier, ShortMAC-I, or the like) of the terminal, terminal identifier information, information on a service received by the terminal, security information [security key], data information, retransmission related information, capability information of terminal equipment, bearer configuration information, configuration information of a MAC layer and an RLC layer [scheduling identifier (x-RNTI, or the like) allocated to the corresponding terminal like C-RNTI], physical layer control channel configuration information, information for measurement and report configuration control management on established connection, or the like.

To transit the terminal equipment in the idle state to the connected state, the terminal equipment requests the connection or performs a message responding to the connection establishment request of the base station to establish the connection, according to a random access procedure or a procedure separately defined in the system. For the connection establishment procedure, the base station and the terminal equipment exchanges the related control message with each other and thus generates the connection configuration information on the terminal equipment. Further, the base station stores and manages the connection configuration information on the terminal equipment until the corresponding terminal equipment is transited to the idle state and transfers the connection configuration information on the terminal equipment to a changed base station when the base station (or node with the RRC function) is changed.

The frequent state transition of the terminal equipment receiving a packet-based service increases an overhead for control signaling to cause the performance degradation of the system. Therefore, even when the terminal equipment is transited from the connected state to the idle state, when satisfying a predetermined condition, the base station continues to store and manage the connection configuration information of the terminal equipment, and thus may omit the connection establishment procedure and immediately provide services for the corresponding terminal equipment. That is, it is possible to reduce the latency required for the connection establishment procedure. Here, the stored connection configuration information that needs to be maintained for information maintenance time may selectively configure some of the above-mentioned connection configuration information and the information of the terminal equipment that needs to be maintained may be separately configured by the base station and the terminal equipment.

Further, the predetermined condition to maintain the connection configuration information even in the idle state may be one of the following conditions.

Condition 1: When the terminal equipment in the idle state satisfies a specific time Condition 2: When the terminal equipment is continuously present in a predetermined area [for example, base station, routing area, tracking area, or area defined to maintain configuration information, or the like]

Condition 3: When a quality of received signals (e.g., RSRP, RSRQ, RSSI, or the like) is equal to or more than a preset reference value (beyond handover area) while the terminal equipment is continuously present in the predetermined area.

When satisfying the above-mentioned predetermined condition, the base station maintains the connection configuration information and when the terminal equipment tries a re-access, the base station may omit the connection establishment procedure (or some procedures) using the stored connection configuration information and immediately provide services for the corresponding terminal equipment. That is, it is possible to minimize a control processing latency due to the connection establishment.

In the case of the condition 1 that the terminal equipment in the idle state satisfies the specific time, the terminal equipment is operated based on a timer and if the timer expires meeting the corresponding timer expiration condition, the stored information of the terminal equipment is deleted and therefore may not be used for the connection establishment procedure.

The time for the terminal equipment to hold the connection configuration information may be set in a time unit such as millisecond, second, minute, hour, and day and may be managed by the timer. If the information maintenance time (or terminal equipment information deletion time) timer expires, the stored information of the terminal equipment is deleted.

The information maintenance time (or timer) of the terminal equipment may be set for each base station or any terminal equipment. When the information maintenance time of the terminal equipment is set for each base station, the base station may use broadcasting system information to transmit the information maintenance time to terminal equipments or the base station may transmit parameters indicating the information maintenance time to the terminal equipment upon the connection establishment (or release).

Meanwhile, when the information maintenance time of the terminal equipment is set for each terminal equipment, the base station may transmit the information maintenance time parameters to the corresponding terminal equipment upon the connection establishment (or release). The information maintenance time parameter or whether to apply the information maintenance time parameter may be determined depending on a service type, a traffic type, user equipment (UE) capability, or the like.

Further, the condition 2 that the terminal equipment is continuously present in the same base station means the case in which the corresponding terminal equipment release the connection establishment to be transited to the idle state and then is present in the base station continuously having performed the connection establishment. In this case, the same base station may also be expanded to the case in which a node (eNB of the LTE system) having an RRC function is the same. Therefore, when it is recognized (or acknowledged) that the terminal equipment continues to be in the idle state within the same base station having performed the connection establishment independent of the time when the terminal equipment is in the idle state, the terminal equipment may use the stored connection configuration information to omit the connection establishment procedure (some procedures), such that it may transmit data to the base station or may be transited to the connected state. When the base station also recognizes the terminal equipment using the stored connection configuration information, the base station may perform a control to omit the connection establishment procedure (or some partial procedures) for the corresponding terminal equipment and immediately provide services.

Further, the condition 3 is the case of considering the quality of received signals of the terminal equipment in addition to the condition 2. When the location of the terminal equipment in the idle state is not the handover area where the quality of received signals satisfies the preset reference value or more while the terminal equipment in the idle state is continuously present in the same base station having performed the connection establishment, the base station may perform a control to use the stored connection configuration information to omit the connection establishment procedure (or some partial procedures) and immediately provide services for the corresponding terminal equipment.

As described above, the stored connection configuration information may reduce the signaling overhead during the re-access process when the connection between the baste station and the terminal equipment is released but the terminal equipment satisfies the information maintaining condition to try a re-access and the maintained connection configuration information of the terminal equipment is omitted when the terminal equipment does not satisfy the information maintaining condition. Further, a selective combination of the condition 1, the condition 2, and the condition 3 may be applied.

The terminal equipment deployed in the moving object may be transited to the idle state depending on traffic characteristics of services that are being provided and a method for allocating and managing a radio source or may perform a discontinuous reception (DRX) operation in the connected state. At this point, when the terminal equipment is in the idle state, the connection establishment procedure needs to be performed and when the DRX operation is performing in the connected state, a uplink resource request procedure is required or when a cell is changed during the DRX operation, a handover procedure needs to be performed. In this case, it is possible to reduce the processing latency by simplifying the control signaling procedure required.

For example, when the moving object moves along a set path, the network (or control node) may estimate the predicted path of the corresponding moving object using location information and a moving direction of the terminal equipment deployed in the moving object, a measurement result for a radio channel, a speed of a moving object, information collected about environment and conditions of a moving path (road, flight path, track, or the like). That is, it is possible to predict a target cell (or group) that a moving object enters while the moving object moves the next halfway destination (or stop). Therefore, the network may transmit the connection configuration information of the corresponding terminal equipment from a source cell to a target cell before a moving object enters the target cell. As such, if the connection configuration information of the terminal equipment or the information of the terminal equipment is transmitted from the source cell to the target cell, the target cell may predict from which time the terminal equipment entering its own service area is controlled.

Figure 3:
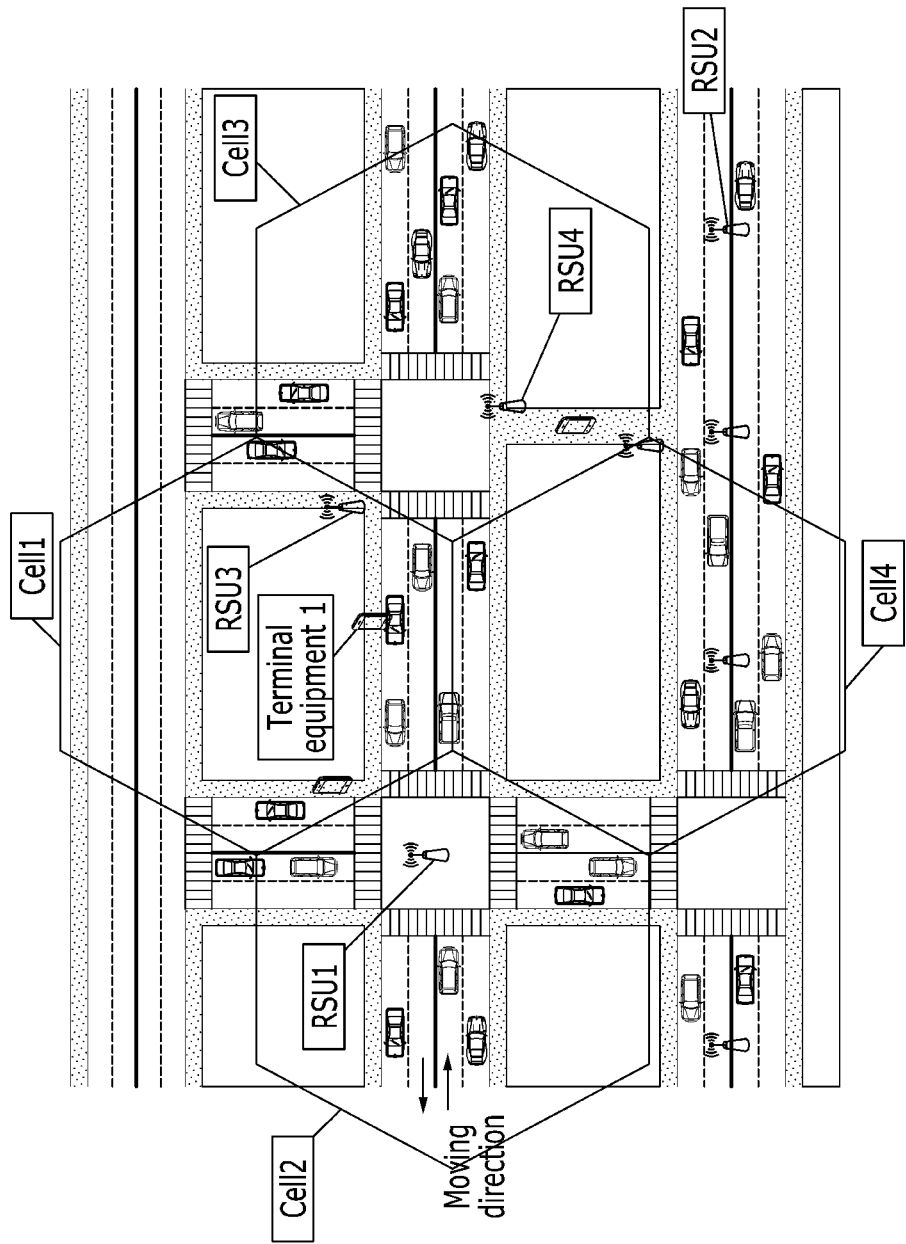
FIG. 3 is a diagram illustrating an example of a vehicle communication system in road environment according to an exemplary embodiment of the present invention.

FIG. 3 is a diagram illustrating an example of a vehicle communication system in road environment according to an exemplary embodiment of the present invention.

Referring to FIG. 3, cell 1 (RSU) may predict time when terminal equipment 1 deployed in a vehicle that is driving a road in a left direction in a service area of the current cell 1 enters a service area of cell 2. That is, the cell 1 may predict time when the terminal equipment 1 enters the service area of the cell 2 based on a traffic density on a road and a crossroad, environment (or attributes) of a road, information collected from vehicles on a road, information collected from adjacent cells cell2, cell3, and cell4, driving information such as a moving speed and a location of the terminal equipment 1 and navigation information, radio channel status information [for example, reference signal received power (RSRP), reference signal received quality (RSRQ), received signal strength indicator (RSSI), signal to interference ratio (SIR), ratio of energy per modulating bit to the noise spectral density (Eb/No), or the like], or the like. Here, the environment (or attribute) of a road may be a lane width, the number of lanes, or a kind of roads (city road, main road, backside road, motorway, expressway, or the like) and may additionally be information such as whether road repairs are progressed, whether a traffic accident occurs, a traffic flow, and a traffic jam situation.

Therefore, the cell 1 transmits the connection configuration information of the terminal equipment 1 of the corresponding vehicle or the information of the terminal equipment 1 to the base station of the cell 2, thereby reducing the control signaling for handover simultaneously with performing the efficient connection establishment and management for the terminal equipment 1.

Generally, in the mobile communication system, the terminal equipment needs to measure adjacent cells while measuring a serving cell for mobility management [handover in the connected state, cell selection/reselection in the idle state]. Here, the serving cell may include a camping cell. When an inter-cell frequency is different, there is a need to measure other frequencies in addition to measurement the frequency of the serving cell.

However, when the method for maintaining connection configuration information of terminal equipment according to the exemplary embodiment of the present invention is applied, the mobility may be efficiently managed only by the measurement for the serving cell (or camping cell). That is, the terminal equipment 1 can control the mobility by measuring only the cell 1 that is the serving cell (or camping cell). The cell 1 may transmit the information of the terminal equipment 1 to the cell 2 in advance or when the terminal equipment 1 is located in an area [for example, handover region] where the service areas of the cell 1 and the cell 2 overlap with each other, based on the radio channel state that the terminal equipment 1 measures and reports and various types of information described above. Further, the cell 1 or the cell 2 may transmit control information or packet data information to the terminal equipment 1 through a downlink.

Figure 4:
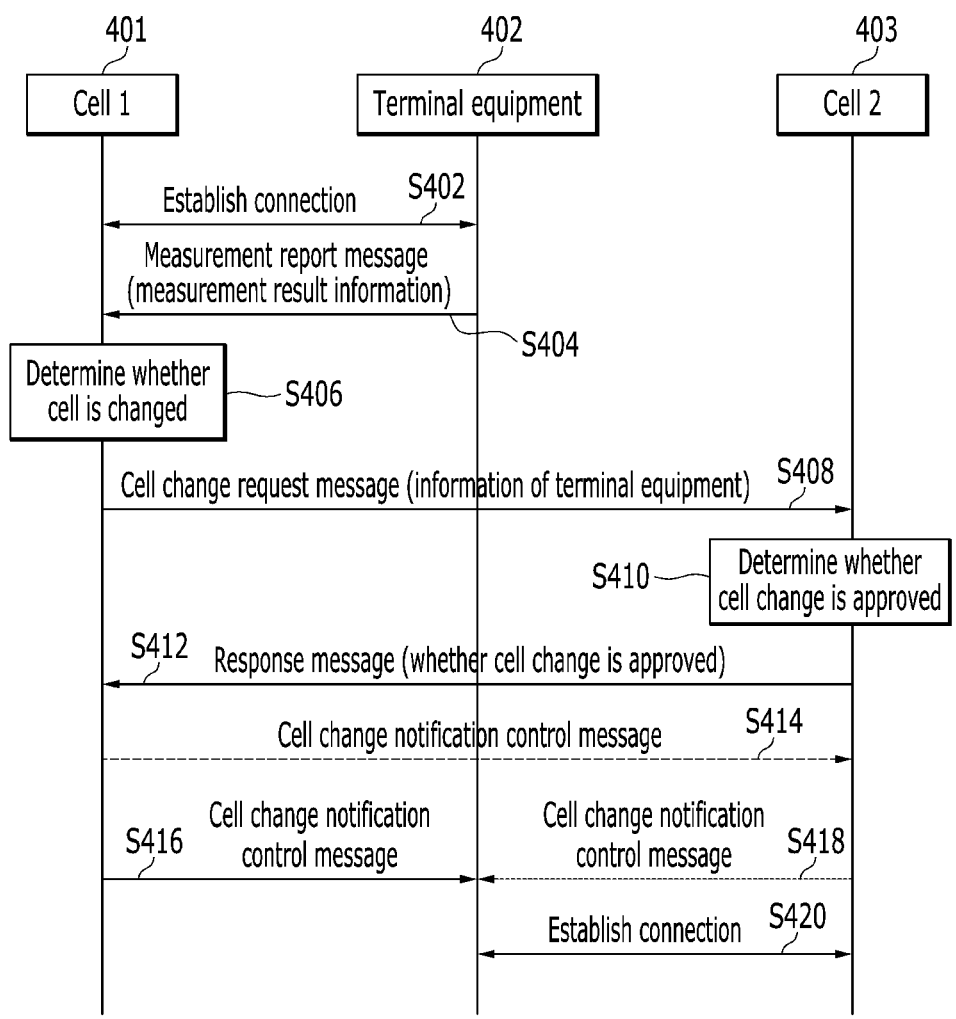
FIG. 4 is a diagram illustrating a method for controlling an access of terminal equipment according to an exemplary embodiment of the present invention.

FIG. 4 is a diagram illustrating a method for controlling an access of terminal equipment according to an exemplary embodiment of the present invention.

Referring to FIG. 4, a cell 1 401 and a cell 2 402 may be a network end node that is configured of an eNB consisting of at least one cell or a multi mode cell [or base station, AP, RSU, transmission point, or the like] supporting at least one radio access technology (RAT) in the LTE system. The terminal equipment 402 establishes the connection with the cell 1 401 to receive services (S402). The terminal equipment 402 may establish the connection with the cell 1 400 to receive services only the moment that it transmits or receives data/signaling information, or the like. As another method, the terminal equipment 402 may be set to transmit or receive the data/signaling information, or the like in the state in which it establishes the connection with the cell until the services that are being provided end. The terminal equipment 402 may be transited to the idle state when completing the packet transmission and reception for providing the services.

The terminal equipment 402 in the idle state or the connected state performs the measurement operation depending on a control message set by the cell 1 401 and periodically or aperiodically transmits a measurement report message including the measurement result information (S404). The aperiodic report means a scheme of reporting the measurement result as an event scheme depending on the predetermined conditions. The cell 1 401 determines whether the cell of the terminal equipment 402 is changed by referring to the measurement result that the terminal equipment 402 reports, the report information collected from another terminal equipment 402 within the service area, information collected from adjacent cells, information transmitted from a server (or function node) of the network, or the like (S406). However, the information that the terminal equipment 402 reports, the information collected from adjacent cells, or the information transmitted from the network means the radio channel status information measured or collected by the terminal equipment 402, the base station, or the like, the driving information such as a moving speed and a location of the terminal equipment 402 and navigation information, information on a moving path (or flight path, track) of a road or the like, the traffic density of a road and a crossroad, the environment (or attribute) information of a road, sensing result information by sensors, image information by an image device (e.g., camera), or the like. The measurement report message may include a moving speed and a location of the terminal equipment 402 and driving information, the radio channel status information, the traffic density of a road and a crossroad, the environment (or attribute) information of a road, the sensing result information by sensors, the image information by an image device (e.g., camera), or the like The cell 1 401 may control the terminal equipment 402 to select only the specific information among the above information and measure or report the selected specific information.

According to the handover procedure of the existing LTE system, the terminal equipment 402 reports the measurement results for the serving cell and adjacent cells to the cell 1 401 that is the serving cell, when meeting the handover condition. The cell 1 401 to which the measurement result is reported selects the target cell to transmit a handover request message. Further, the cell 1 401 receives radio resource allocation information for the terminal equipment 420 from the cell 2 403 that is the target cell, along with a response message. The cell 1 401 transmits a control message [for example, connection reconfiguration (RRC connection reconfiguration) message including mobility control information (MCI)] instructing a handover to the terminal equipment 402. The terminal equipment 402 receiving the connection reconfiguration message tries an access to the cell 2 403 to transmit a handover complete message (e.g., connection reconfiguration complete message) to the cell 2 403, thereby completing the handover procedure.

However, according to the exemplary embodiment of the present invention, the cell 1 401 that is the serving cell (or camping cell) determines whether the cell of the terminal equipment 402 is changed by referring to the measurement report information from the terminal equipment 402, the report information collected from other terminal equipments within the service area, the information collected from adjacent cells, the information transmitted from the server of the network, or the like, as described above (S406). That is, a method for reporting a measurement result by determining whether terminal equipment 402 meets a handover condition or a cell change condition is not applied. The cell 1 401 determines whether the cell is changed in consideration of the measurement report information, the collected information, the path and location information of the moving object, or the like. The cell 1 401 may select the target cell when meeting the preset conditions and trigger a procedure of handing over the mobility and connection control management function for the terminal equipment 402. Here, the preset conditions mean determining whether the measurement results for the serving cell and the target cell, the path and location information of the terminal equipment 402, or the like meet the cell change condition. To determine and trigger whether the cell is changed, the cell 1 401 may previously set at least one target cell or the measurement and report parameters for the specific frequency in the terminal equipment 402 and determine whether the cell is changed based on the measurement result from the terminal device 402. That is, the terminal equipment 402 may perform the measurement operation only for the cell, the frequency, or the transmission node of the RAT that is set for the cell 1 401 to perform the measurement and report operation and report the measurement result. That is, the measurement operation for the cell, the frequency, or the transmission node of the RAT that is not set for the measurement and report operation is not performed and the measurement report message is not also transmitted. Even when the cell, the frequency, or the transmission node of the RAT that is not set is detected during the measurement, the terminal equipment 402 reports only the measurement result for the cell, the frequency, or the transmission node of the RAT that is set for the report.

When the cell 1 401 decides to change the serving cell (or camping cell) of the terminal equipment 402 to the cell 2 403, the cell 1 401 transmits the cell change request message including the information of the corresponding terminal equipment 402 to the cell 2 403 (S408).

When the cell 2 403 receives the cell change request message from the cell 1 401, the cell 2 403 determines whether the cell change is approved (S410) and transmits a response message including whether the cell change is approved to the cell 1 401 (S412). If necessary, the cell 2 403 may determine another cell [for example, cell of another frequency (or system bandwidth) or cell (or node) using another radio access interface] that may provide services for the terminal equipment 402 and may transmit information on the determined cell to the cell 1 401.

At this point, the response message may include the information of the determined cell. Further, the cell 2 403 may transmit the radio resource allocation information of the cell 2 403 for the terminal equipment 402 [or cell designated for the terminal equipment 402 transmitted to the cell 1 402 by the cell 2 403] by including the radio resource allocation in the response message. The radio resource allocation information may include configuration information on radio resources of a downlink and an uplink such as a scheduling identifier, a physical layer control channel, transmit power, and a DRX operation parameter.

The cell 1 401 receiving the response message from the cell 2 403 may transmit a cell change notification control message that indicates handing management or control authority (or function) for the terminal equipment 402 over the cell 2 403 to the cell 2 403 (S414).

Meanwhile, in the step S408, the cell 1 401 may transmit time when the management or control authority for the corresponding terminal equipment 402 is handed over to the cell 2 403 and the related control information, simultaneously with transmitting information on predicted time when the terminal equipment 402 enters the service area of the cell 2 403 to the cell 2 403. In this case, in the step S414, the cell change notification control message transmitted to the cell 2 403 by the cell 1 401 may be omitted.

The cell 1 401 or the cell 2 403 may transmit the cell change notification control message to the terminal equipment 402 to notify that the serving cell or the camping cell is changed (S416 and S418). When the cell 1 401 transmits the cell change notification control message in the step S416, the radio resource allocation information of the cell 2 403 for the terminal equipment 402 received from the cell 2 403 in the step S412 is transmitted.

The transmission of the cell change notification control message in the step S414 may be performed simultaneously with the transmission of the cell change notification control message in the step S416. Further, the cell 1 401 may transmit the control message for subsequent procedures such as serial number (SN) status information transmission, data forwarding, or handover performance (or cell change) indication completion to the cell 2 403 after or before the step S416.

Only one of the steps S416 and S418 may be selectively applied without overlapping with each other. That is, the terminal equipment 402 may also receive the cell change notification control message from the cell 2 403 that is the target cell, not from the cell 1 401.

For example, when the terminal equipment 402 does not receive the cell change notification control message transmitted by the serving cell or the step S16 is not normally performed due to various circumstances, the cell 1 401 may not transmit the control message for the subsequent procedures such as the SN status information transmission, the data forwarding, and the handover performance (or cell change) indication completion to the cell 2 after or before the step S416. When the control message for the subsequent procedures such as the cell change notification control message or the SN status information transmission in the step S414 within the predetermined conditions (e.g., timer, or the like) after the response message is transmitted to the cell 1 401 in the step S412, the data forwarding, and the handover performance (or cell change) indication completion is not transmitted from the cell 1 401, the cell 2 403 may transmit the cell change notification control message to the terminal equipment 402 (S418). Therefore, when the step S416 is performed, the step S416 is omitted, or the step S416 is not normally performed, only in the step S418, the cell 2 403 may transmit the cell change notification control message, RRC context related resource allocation information, or storage and management information on the terminal equipment 402. In particular, the terminal equipment 402 may transmit the cell change notification control message or the separate control message or traffic packet even before the access procedure performance such as the random access for the cell 2 403 or the uplink transmission. Further, the cell 2 403 may transmit the radio resource allocation information for device to device communication.

The cell change notification control message transmitted by the cell 2 403 that is the target cell 2 403 may include the uplink radio resource allocation information of the cell 2 403 which the terminal device 402 may transmit to the cell 2 403. Here, the uplink radio resource allocation information of the cell 2 403 may include configuration information of a physical layer radio resource as scheduling information on resources (for example, random access resource such as random access preamble index) for performing a random access procedure or radio resources for transmission of an uplink data packet, modulation and coding information, transmission time, or transmission radio frame (e.g., radio frame, subframe, slot, symbol index, or the like) information, or the like. Therefore, the terminal equipment 402 receiving the cell change notification control message in the step S418 uses the random access or uplink resource allocation information within the cell change notification control message to transmit the packet information to the cell 2 403 and successfully ends the cell change procedure when receiving the packet information. Here, the packet information transmitted to the cell 2 403 by the terminal equipment 402 means ACK/NACK information notifying the reception of the cell change notification control message in the step S418, a control message notifying the cell change completion (or connection reconfiguration completion), data of the terminal equipment 402, the uplink transmission for the random access procedure performance for the uplink synchronous acquisition or a message transmitted to the cell 2 403 after the terminal equipment 402 that is a cell change target receives the cell change control message in the step S418 as a separate control message, or the like.

Further, the cell 2 403 may overlappingly retransmit the cell change notification control message in the step S418 more than once within a preset time duration or until the terminal equipment 402 receives the packet information transmitted to the uplink using the uplink radio resource allocation information within the cell change notification control message in the step S418.

The terminal equipment 402 receiving the cell change notification control message through the step S416 or the S418 may configure the connection with a new cell 2 403 changed to receive services (S420). In the step S420, the terminal equipment 402 may transmit the control message or the packet information to the uplink using the radio resource allocation information of the target cell [for example, cell 2 403] transmitted through the cell change notification control message in the step S416 or S418.

Further, in the procedure of FIG. 4, the cell change procedure may be performed using the procedures changed as follows. For the cell change, the steps S402 to S412 are performed between the terminal equipment 402 and the cell 1 401 and the cell 2 403. Even though the terminal equipment 402 does not successfully receive the cell change notification control message transmitted to the terminal equipment 402 by the cell 1 401 in the step S416 or the terminal equipment 402 successfully receives the cell change notification control message, an error may occur in the ACK/NACK information transmitted to the cell 1 401 by the terminal equipment 402. Alternatively, the cell 1 401 may also perform only up to the step S412. In this case, the cell 1 401 may determine that the step S416 does not successfully end. Therefore, the cell 1 401 may not transmit the cell change notification control message in the step S414 or the control message for subsequent procedures such as the serial number (SN) status information transmission, the data forwarding, and the handover performance (or cell change) indication completion to the cell 2 403 after or before the step S416.

As described above, before the cell 2 403 transmits the cell change notification control message in the step S418 to the terminal equipment 402, the terminal equipment 402 may try the random access to the cell 2 403 or may try the uplink transmission to the cell 2 403 by another method.

When the terminal equipment 402 does not successfully receive the cell change notification control message transmitted to the terminal equipment 402 by the cell 1 401 in the step S416 or performs only up to the step S412, the terminal equipment 402 may try the random access to the cell 2 403 using the acquired information of the cell 2 403 or transmit the packet information to the uplink using the available uplink resource (e.g., contention-based shared radio resource) of the cell 2 403 before the connection establishment with the cell 2 403. However, the terminal equipment 402 does not receive the cell change notification control message in the step S416 transmitted by the cell 1 401, the terminal equipment 402 may notify the cell 2 403 of the situation and notify that the cell change procedure is performing. For this purpose, the terminal equipment 402 may transmit the information (for example, cell identifier, or the like) of the cell 1, the information of the identifier, or the like of the terminal equipment 402 to the cell 2 403. When receiving the information of the cell 401 and the information of the terminal equipment 402 along with the information notifying that the cell change procedure is performing from the terminal equipment 402, the cell 2 403 confirms whether the terminal equipment 402 is the terminal equipment 402 that permits the cell change through the steps S408 and S412 and if it is determined that the terminal equipment 402 is the terminal equipment 402 that permits the call change, transmits the cell change notification control message to the terminal equipment 402 (S418). Next, the cell 2 403 may request the control message for the subsequent procedures such as the SN status information transmission, the data forwarding, or the handover performance (or cell change) indication completion, or the like to the cell 1 401 and receive the control message or may request the transmission to the terminal equipment 402 and receive the control message.

Meanwhile, when the terminal equipment 402 successfully receives the cell change notification control message in the step S416 but an error occurs in the ACK/NACK information transmitted to the cell 1 401 by the terminal device 402, the terminal device 402 uses the uplink radio resource allocation information of the cell 2 403 within the received cell change notification control message to perform the uplink transmission procedure to the cell 2 403. However, the uplink radio resource allocation information of the cell 2 403 within the cell change notification control message may be the scheduling information on the resource for performing the random access procedure or the radio resource for the uplink data packet transmission. The cell 2 403 may use the uplink radio resource transmitted through the cell 1 401 to change the cell to recognize that the terminal equipment 402 is the terminal equipment that is performing the cell change based on the transmitted information. Next, the cell 2 403 transmits the cell change notification control message to the terminal equipment 402 (S418). The cell 2 403 may request the control message for the subsequent procedures such as the SN status information transmission, the data forwarding, or the handover performance (or cell change) indication completion, or the like to the cell 1 401 and receive the control message or may request the transmission to the terminal equipment 402 and receive the control message.

The cell change depending on the procedures illustrated in FIG. 4 may notify the terminal equipment 402 that the serving cell is changed without identifying the connected state or the idle state unlike the existing handover procedure that targets the terminal equipment 402 in the connected state. Further, in the procedure illustrated in FIG. 4, a method for transmitting and managing connection configuration information on the terminal equipment 402 in the idle state between cells may be applied.

As described above, the base station may store and manage the connection configuration information on the terminal equipment 402 in the idle state when meeting the predetermined conditions. For example, in the procedure of FIG. 4, the cell 1 401 may transmit the connection configuration information (RRC context) on the terminal equipment 402 in the idle state that is being stored and managed to the cell 2 403. Therefore, the cell 1 401 or cell 2 may use the method for transmitting a paging message to the terminal equipment 402 in the idle state based on the connection configuration information for the terminal equipment 402 in the idle state to transmit the cell change notification control message in the step S416 (or S418) or use the separate procedure for transmitting the cell change notification control message to transmit the cell change notification control message.

For this purpose, the terminal equipment 402 monitors the preset downlink physical layer channel (or physical layer control channel) to receive the message notifying the cell change when the quality of received signal, the location information, a cell stay time parameter, or the like of the serving cell while moving along the path meets the predetermined conditions. The cell change notification control message may be transmitted using the scheduling identifier (e.g., P-RNTI, C-RNTI for multicast transmission, or separately designated C-RNTI) notifying the reception of the cell change message or an indicator notifying the cell change. The indicator notifying the cell change may consist of parameters within the physical layer control information transmitted to the downlink physical layer channel. The terminal equipment 402 may use the scheduling identifier, the indicator, or the like notifying the reception of the cell change notification control message through the downlink monitoring to receive the cell change notification control message.

The procedure of handing over the management or control authority for the terminal equipment 402 illustrated in FIG. 4 may be described as cell switching, cell change, anchoring, or the like and the above-mentioned procedure may perform the management and/or connection control for the terminal equipment 402 faster than the existing handover procedure.

According to the existing LTE system, the terminal equipment 402 in the idle state accesses the corresponding cell every time it enters a new cell when the cell is changed during the movement of the terminal equipment 402 not to perform the operations such as registration and location update. Further, the terminal equipment 402 in the idle state performs only the measurement operation for cell selection and reselection and does not report the result to the camping cell or the new cell.

However, according to the exemplary embodiment of the present invention, when the terminal equipment 402 that is moving along a road, a flight path in the air, or a track satisfies the predetermined conditions in the idle state, it performs a control to perform the operations such as the registration in the cell that is currently being camped, the location update (or report), and measurement result report.

For example, when the terminal equipment 402 in the idle state satisfies the following conditions during the movement, the base station may perform a control (or configuration) to allow the terminal equipment 402 to perform the procedure of the cell registration, the location update (or report), or the measurement result report.

First, when the number of passing nodes during the movement meets the condition for the preset number of passing nodes, Second, when satisfying the preset timer value Third, when moving up to the preset distance.

Fourth, when changing the progress direction,

Fifth, when entering the set cell to perform the procedure of the cell registration, the location update (or report), or the measurement result report, Sixth, when satisfying the selective combination of the first to fifth conditions, In the case of the second condition, the timer reference values for the cell registration, the location update (or report), or the measurement result report are set. When the corresponding timer satisfies the reference value, the terminal equipment 402 in the idle state performs the procedure of the cell registration, the location update (or report), or the measurement result report. For example, the terminal equipment 402 initializes the timer value when being transited from the connected state to the idle state, when performing the procedure of the cell registration, the location update (or report), or the measurement result report, or depending on the separate conditions. Further, when the timer value reaches the set reference value for the cell registration, the location update (or report), or the measurement result report while the initialized timer value is increased and counted, the terminal equipment performs the procedure of the cell registration, the location update (or report), or the measurement result report.

In the case of the third condition, a moving distance reference value for the cell registration, the location update (or report), or the measurement result report is set. When the moving (driving or flying) distance satisfies the reference value, the terminal equipment 402 performs the procedure of the cell registration, the location update (or report), or the measurement result report. For example, the terminal equipment 402 initializes the moving distance value when being transited from the connected state to the idle state, when performing the procedure of the cell registration, the location update (or report), or the measurement result report, or depending on the separate conditions. Further, when the calculated (or estimated) moving distance satisfies the set reference value for the cell registration, the location update (or report), or the measurement result report while the terminal equipment 402 is moving, the terminal equipment performs the procedure of the cell registration, the location update (or report), or the measurement result report.

In the case of the fourth condition, the reference value for the direction change for the cell registration, the location update (or report), or the measurement result report is set. When the direction change (or extent of the direction change) satisfies the predetermined conditions or the reference value, the terminal equipment 402 performs the procedure of the cell registration, the location update (or report), or the measurement result report. For example, the terminal equipment 402 initializes the calculation, estimation, or determination value for the direction change (or extent of the direction change) when being transited from the connected state to the idle state, when performing the procedure of the cell registration, the location update (or report), or the measurement result report, or depending on the separate conditions. Further, when the calculated (or estimated) direction change (or extent of the direction change) satisfies the set reference value for the cell registration, the location update (or report), or the measurement result report while the terminal equipment 402 is moving, the terminal equipment performs the procedure of the cell registration, the location update (or report), or the measurement result report. Here, the direction change (or extent of the direction change) may mean the direction change such as left rotation, right rotation, and U-turn as well as a change extent for a change (or rotation) angle and a change in altitude In particular, in the case of the fifth condition, the terminal equipment 402 in the idle state may set or notify the cell that needs to perform the procedure of the cell registration, the location update (or report), or the measurement result report message transmission based the system information, the cell identifier, the type (or kind) of cells, the location of cells, the cell of the preset frequency, or the separate control message (or identifier) transmission. Here, the cell identifier is a parameter for determining whether the physical layer identifying cells or the unique identifier meets the preset conditions. The type (or kind) of cells is a parameter identifying the type or kind of cells such as a macro cell, a CSG cell, and an RSU. The location of cells is information identifying a crossroad, a road entering and exiting point, and junctions or joining points of all paths, or the like or a parameter notifying the cell of the corresponding point. The cell of the preset frequency is a parameter identifying a licensed band, an unlicensed band, a cell of a specific frequency, or the like. That is, the terminal equipment performs the procedure of the cell registration, the location update (or report), or the measurement result report when the above-mentioned parameter enters the cell meeting the corresponding condition. The base station may set the parameters for performing the procedure of the cell registration, the location update (or report), or the measurement result report message transmission and transmit them through a common control message such as system information or transmit them to the terminal equipment 402 through a dedicated control message such as a disconnection message.

For the procedure of the cell registration, the location update (or report), or the measurement report as described above, the messages transmitted by the terminal equipment 402 in the idle state may be transmitted in a unicast, multicast, or broadcast scheme. Further, when transmitting the control message for the cell registration, the location update (or report), the measurement result report, or the like, the terminal equipment 402 may also transmit additional information such as the location information of the terminal equipment 402, the status information (e.g., battery state, predicted path information, or the like) of the moving object, status information (e.g., construction situation, moving object density, climate information, or the like) of passing paths, or information separately requested by the system.

When the transmission is made in the unicast scheme, the terminal equipment 402 receives radio resource allocation information for unicast transmission from the cell, and performs the transmission through the corresponding radio resource.

Further, when the transmission is made in the multicast or broadcast scheme, a transmission method may use a radio resource of a radio access interface (e.g., Uu interface of the LTE system) between the terminal equipment 402 and a cell or a radio resource of a radio access interface (e.g., PC5 interface of the LTE/LTE-A system) for device-to-device. The radio resource for multicast or broadcast transmission may be allocated from the cell or may be selected by the terminal equipment (or terminal group) depending on the predetermined conditions.

Further, the terminal equipment 402 in the connected state may perform the same operation depending on the cell change procedure for the terminal equipment 402 in the idle state or the procedure of the cell registration, the location update (or report), or the measurement result report as described above.

Further, the terminal equipment 402 in the connected state may also receive the cell change notification control message through the scheduling identifier (e.g., C-RNTI, C-RNTI for multicast transmission, SPS-RNTI, or the like) allocated to the corresponding terminal equipment 402 or may transmit the cell registration, the location update (or report), or the measurement result repot message.

The target cell may transmit RRC context related resource allocation information or the information [for example, the capability, of the terminal equipment, the location information, the interest services/function information of the corresponding terminal equipment, the priority information, or the like], which is being stored and managed, on the terminal equipment 402 in the idle state while notifying the terminal equipment 402 of the cell change depending on the above-mentioned procedure.

That is, according to the cell change procedure in accordance with the exemplary embodiment of the present invention, the terminal equipment 402 may receive the cell change notification control message or the RRC context related resource allocation information or the information, which is being stored and managed, on the terminal equipment 402 in the idle state from the target cell (cell 2 of FIG. 4), not from the serving cell (cell 1 of FIG. 4).

Meanwhile, when the terminal equipment 402 tries an access to a base station different from the base station that stores and manages the connection configuration information due to the movement of the terminal equipment 402, the base station that maintains the information of the terminal equipment 402 notifies the base station on which the terminal equipment performs the connection establishment procedure of the related information to receive the information of the terminal equipment 402 through the network.

When the serving cell or the target cell [or next cell located on a moving path as a new serving cell (or camping cell)] transmits the cell change notification control message, the RRC context related resource allocation information, or the information, which is being stored and managed, on the terminal equipment 402 as described above, the corresponding information may be transmitted to the terminal equipment 402 in a form such as connection reconfiguration message (e.g., RRC connection reconfiguration), paging message, and control message for cell switching (or cell change) notification. The message may configure the physical layer control information using a scheduling identifier (e.g., C-RNTI) allocated to the corresponding terminal equipment 402, a group scheduling identifier allocated to a specific terminal group, a group scheduling identifier allocated for a specific service, or a common scheduling identifier and the corresponding control message may be transmitted.

Therefore, when receiving the physical layer control channel, the terminal equipment 402 may monitor a common search space that monitors a common scheduling identifier (or specific group scheduling identifier) or monitor a UE specific search space that monitors the scheduling identifier (or specific group scheduling identifier) allocated to the terminal equipment 402 to confirm whether there is the control message notifying the cell change notification control message, the RRC context related resource allocation information, or the information, which is being stored and managed, on the terminal equipment 402 and receive the corresponding control message.

In particular, for the target cell to transmit the cell change notification control message, the RRC context related resource allocation information, or the information, which is being stored and managed, on the terminal equipment 402, the connection reconfiguration message transmitted to the terminal equipment 402 through the serving cell may include the radio resource allocation information for the corresponding terminal equipment (or terminal group).

The radio resource allocation information may include information shown in the following Table 1.

TABLE 1

Non-contention RA preamble allocation information (available RA resource, preamble index information, or the like) for any access to target cell
C-RNTI for corresponding terminal allocated from target cell
C-RNTI for group for corresponding terminal group allocated from target cell
SPS-RNTI for corresponding terminal allocated from target cell
Parameter for power control such as maximum transmit power from target cell
    RNTI for power control:
        TPC-PUCCH-RNTI (Transmit power control-physical uplink control channel-RNTI)
        TPC-PUSCH-RNTI (Transmit power control-physical uplink shared channel-RNTI)
Offset value comparing difference in transmit or receive power TABLE 1-continued between target cell and source cell
Identifier information of target cell
Physical layer resource construction information of target cell
Downlink physical channel configuration information
Uplink physical channel configuration information
Physical channel configuration and resource pool information for
providing V2X service
Radio resource information allocated from target cell to
corresponding terminal
    Resource allocation information for providing V2X service
    V2X resource information allocated from target cell to corresponding
    terminal (or group)
    V2X resource pool information that may be commonly shared by
    a target cell or shared with the corresponding terminal (or group)
    by the target cell
        MAC configuration information (MAC main configuration
        information, or the like) including DRX operation parameter,
        or the like PUCCH (Physical uplink control channel) resource
        allocation information
        Allocation information and PRB (Physical resource block)
        information of CSI / DM-RS / SRS (Sounding reference signal)
        resource, or the like Further, even before the terminal equipment 402 performs the access procedure such as random access to the target cell or performs the uplink transmission, the target cell may transmit to the terminal equipment 402 the cell change notification control message, the RRC context related resource allocation information, the information, which is being stored and managed, on the terminal equipment 402 or transmit the separate control message or traffic packet to the terminal equipment 402. Further, the target cell may transmit the radio resource allocation information for device-to-device communication.

Further, when the plurality of terminal equipments configure the group and move, the specific terminal equipment (for example, representative terminal equipment, terminal equipment located at the head of the group, terminal equipment located in the middle within the group, or the like) in a group may transmit the received corresponding control message to the terminal equipments in the broadcast or multicast scheme.

Figure 5:
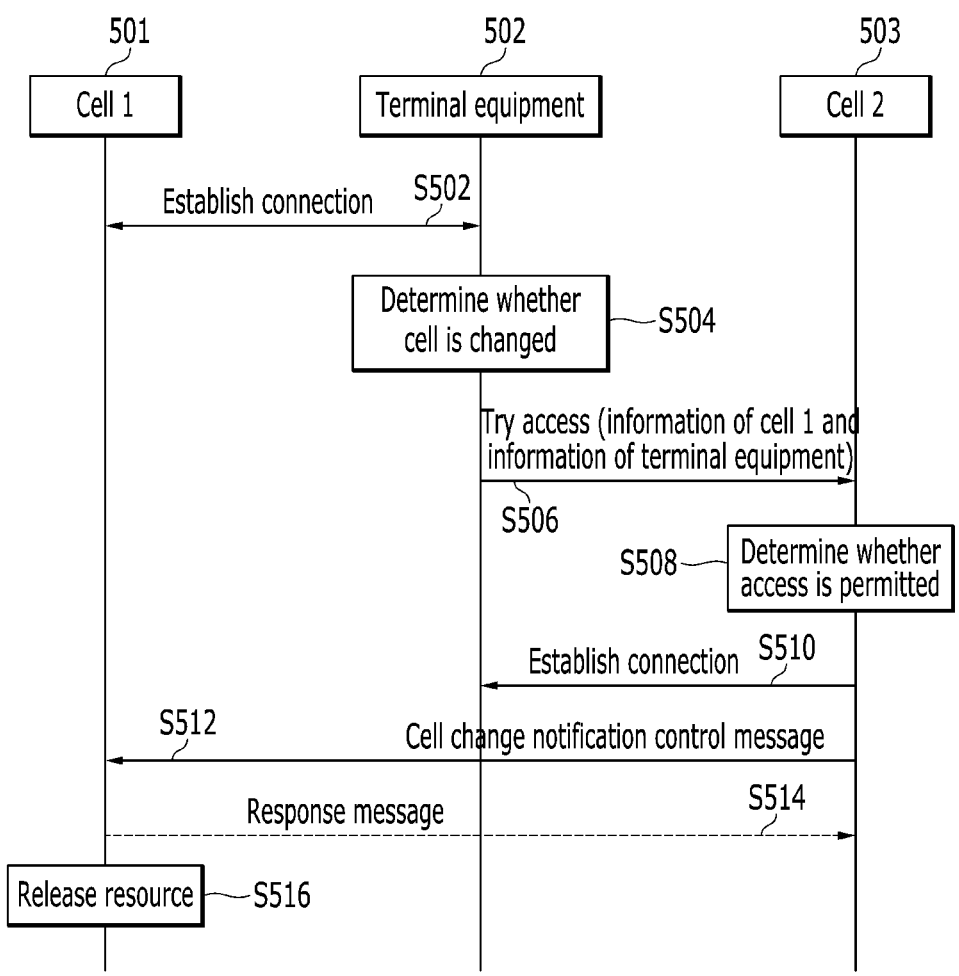
FIG. 5 is a diagram illustrating a cell change procedure dominantly determined by terminal equipment according to an exemplary embodiment of the present invention.

FIG. 5 is a diagram illustrating a cell change procedure dominantly determined by terminal equipment according to an exemplary embodiment of the present invention.

Referring to FIG. 5, terminal equipment 502 is connected to the cell 1 401 to receive services (S502). The terminal equipment 502 may establish the connection with the cell 1 501 to receive services only the moment that it transmits or receives data/signaling information, or the like. As another method, the terminal equipment 502 may be set to transmit or receive the data/signaling information, or the like in the state in which it establishes the connection with the cell until the services that are being provided end. The terminal equipment 502 may be transited to the idle state when completing the packet transmission and reception for providing the services.

The terminal equipment 502 in the idle state or the connected state performs the measurement operation depending on the control message set by the cell 501 and periodically or aperiodically reports the measurement result to the cell 1 501.

The cell 1 501 may provide information on adjacent cells or a cell 2 503 that is a next cell located on a moving path of the terminal equipment 502 to the terminal equipment 502 by referring to the measurement result reported by the terminal equipment 502, the report information collected from other terminal equipments within the service area, the information collected from adjacent cells, the information transmitted from the server of the network, or the like.

Further, the cell 1 501 may set the related control parameters to allow the terminal equipment 502 to perform the measurement operation or the access procedure for the cell 2 503. The set control parameters may include the information (e.g., transmission frequency, cell identifier, form information of a cell and version information of a cell, or the like) on the target cell, the RRC context related resource allocation information, and the radio resource allocation information transmitted to the terminal equipment 502 through the source cell.

The terminal equipment 502 determines whether the cell is changed based on the measurement operation for the cell 2 503 (S504). The terminal equipment 502 determines the cell change when a difference value between a quality of received signal of the cell 2 503 and a quality of received signal of the cell 1 501 or the quality of received signal of the cell 2 503 meets a preset reference value for the cell change (or cell switching) and tries the access to the cell 2 503 (S506).

The terminal equipment 502 may use the random access procedure or the separate uplink radio resource set for the cell change, or the previously allocated uplink resource, thereby performing the access procedure.

Further, the terminal equipment 502 may transmit the information of the cell 1 501 and the information of the terminal equipment 502. The information of the cell 1 501 may be information such as a cell identifier and time staying in the corresponding cell. Further, the information of the terminal equipment 502 may include the identifier information (e.g., TMSI, C-RNTI allocated by the target cell, or the like) of the terminal equipment 502, the moving status information (e.g., location information, the moving speed, the moving path information, or the like), the capability information, the service information that is being provided, and the measurement result (or report) information, or the like of the terminal equipment 502.

The cell 2 503 determines whether the access to the corresponding terminal equipment 502 is permitted (S508). If it is determined that the access to the terminal equipment 502 is permitted, the cell 2 503 transmits the control message or the packet data for the connection establishment for the terminal equipment 502 or service provision to the terminal equipment 502 (S510). Further, the cell 2 503 may transmit the cell change notification control message notifying the cell change to the cell 1 501 along with the information of the terminal equipment 502 (S512).

The cell 1 501 transmits the response message to the cell change notification control message to the cell 2 503 (S514). The cell 1 501 may transmit the moving status information of the terminal equipment 502, the capability information, the service information that is being provided, the RRC context information, or the like by including them in the response message. Further, the cell 1 501 releases the radio resource that is allocated to the terminal equipment 502 (S516).

The cell 1 501 may delete the information, which is stored and managed, such as the RRC context information on the corresponding terminal equipment 502 based on the timer after a predetermined time lapses.

Meanwhile, when service areas of a plurality of cells overlap with each other or in the case of special areas (e.g., crossroad, joining/branch points on the moving path), to improve system performance along with efficiently controlling the mobility, the corresponding cells may allocate the radio resource to the terminal equipment in co-ordination or allocate the same radio resource (or common radio resource) and operate it. That is, the plurality of cells may allocate the radio resource (communication resource pool or discovery resource pool) for device-to-device communication, the radio resource for the control signal transmission for device-to-device communication, the downlink radio resource for the reference signal, the random access resource, or the control information transmission, or the like in co-ordination or may use the same (or common) radio resource. When the radio resource is allocated in co-ordination, the information on the state of the moving path, the density of the terminal equipment, the moving speed of the terminal equipment, or the like is exchanged between the cells to control the radio resource allocation managed in co-ordination. The control may be made over time or by an aperiodic (or event triggering) method and the conditions for the aperiodic method may be separately set. Therefore, when meeting the conditions for the aperiodic method, the cell, the terminal equipment (or RSU), or the like may request the allocation control of the radio resource managed in co-ordination or trigger the allocation change.

The cell change procedure described with reference to FIGS. 4 and 5 may be applied to a procedure for handover or cell change of a general user terminal (for example, cellular phone, smart phone, or the like) in a wireless communication system or terminal equipment that does not follow a preset path (or specific path).

For example, the context information of the terminal equipment may be transmitted to target nodes around a serving node to previously perform the connection establishment with at least one of a plurality of nodes in a handover (or cell change) preparation operation. In this case, the surrounding target nodes may be a node in the same RAT scheme as the service node or a node in other wireless access technology schemes. Further, the target node may be selected by the terminal equipment, not by the networks (for example, base station, cell, eNB, AP, or the like) and is reported to the serving node, thereby performing the connection establishment with the corresponding target node.

In this case, when the terminal equipment that is performing the handover (or cell change) procedure tries the access to the target node (e.g., random access procedure performance) or successfully ends the first transmission (e.g., transmission of the control message or the packet data), it may be determined that the terminal equipment completes the handover (or cell change) procedure. In this case, the target node may transmit the control message (e.g., connection reconfiguration message) that stands for the completion of the handover (or cell change) procedure to the terminal equipment.

Further, the serving node receiving the control message notifying the completion of the handover (or cell change) for the corresponding terminal equipment from the target node deletes the connection configuration information of the corresponding terminal equipment. In this case, the serving node may set a separate timer and delete the information of the terminal equipment after the corresponding timer ends. The corresponding timer may start a count at time when a serving node receive the control message notifying the completion of the handover (or cell change) procedure from the target node or when the serving node starts the handover (or cell change) procedure.

Further, the terminal equipment uses the procedure under the environment (or condition), not at a boundary of the cell (or node) service area where the above-mentioned handover or cell change procedure needs to be performed, thereby establishing and maintaining the connection with at least one network node. In this case, the plurality of network nodes may be a node to which different radio access technologies are applied. The connection of the terminal equipment with the plurality of network nodes means a connection on a control plane. That is, it means the connection establishment for the signaling procedure of the control message for the connection control such as the establishment, change, maintenance, and release of the connection to transmit the packet data.

Therefore, the terminal equipment may use at least one of the plurality of nodes of which the connection is established depending on the attributes of services, the priority, the capability of the terminal equipment that are provided through the plurality of network nodes of which the connection is established, thereby transmitting or receiving the packet data. When the packet data are transmitted and received to and from the plurality of nodes, one of the plurality of nodes that establish the connection for the control plane may be set as representative control node (for example, master control node or primary control node).

The control node other than the representative control node among the plurality of nodes that establishes the connection of the control plane becomes a secondary control node. The secondary control node may generate the control information for providing services to the corresponding terminal equipment and transmit the generated control information to the representative control node and may receive the configuration information for mobility management or measurement management from the representative control node to transmit the control message to the corresponding terminal equipment or receive the control message from the corresponding terminal equipment. However, the secondary control node performs an auxiliary function in the connection control and performs the determination or decision on the control and management to the representative control node. Therefore, the representative control node receives the related information for the connection control from the secondary control node to perform a final determination operation and transmits the connection control setting parameter depending on the determination to the secondary control node or the terminal equipment. To efficiently perform the operation difference between the control nodes, the secondary control node may be set to deactivate or restrictively operate some of the connection control functions that the representative control node performs. For example, the connection establishment of the secondary control node with the terminal equipment may be based on the following scheme.

First, when only the connection establishment is maintained,

Second, when the control signaling message for the connection establishment and the connection establishment with the terminal equipment may be transmitted and received, Third, when the connection establishment and the data transmission and reception to and from the terminal equipment are performed, Like the first scheme, the case in which the secondary control node maintains only the connection establishment with the terminal equipment means the situation in which the secondary control node and the terminal equipment stores the configuration information like the RRC context (or AS configuration information). Therefore, the terminal equipment merely stores the configuration information like the RRC context for the secondary control node, and does not transmit and receive the signaling information or data to and from the corresponding secondary control node, and does not report the measurement result for the corresponding secondary control node, or the like. However, the terminal equipment may use the stored configuration information to maintain the state in which the signaling information or the data can be transmitted and received to and from the secondary control node if necessary.

For the second and third cases, some functions may be deactivated or activated to selectively operate the function of the secondary control node. The second case corresponds to the case in which the only the control signaling function of the secondary control node is activated and the data transmitting/receiving operation function and procedure are deactivated. Further, the third case corresponds to the case in which the data transmitting/receiving operation function and procedure of the secondary control node are activated.

Further, the connection control function that may perform only the representative control node may be set and the representative control node or the secondary control node may also be identified through the activation or deactivation of the corresponding function.

Therefore, the secondary control node may be the representative control node by activating the connection control function deactivated and some of the connection control functions that the representative control node performs may be changed to the secondary control node while being deactivated. The activation and the deactivation of the connection control function of the control nodes may be determined and changed by the exchange and consultation of the signaling information between the nodes.

The relationship between the base station (or cell) and the terminal equipment depending on the connection state of the representative control node, the secondary control node, or the like may be identified as the following Table 2.

TABLE 2

| Division | Relationship between base station and terminal |
|---|---|
| Serving base station | The terminal equipment may use non-contention based resources to make a resource request (or scheduling request) and may monitor a downlink control channel of a serving base station to immediately receive information transmitted from the base station. That is, the serving base station is a base station that may establish the connection with the terminal equipment and transmit and receive data or control information. One terminal equipment may have at least one serving base station. |
| (Linked/connected) base station | The terminal equipment may use non-contention resources (or contention-based resources) periodically allocated to make a resource request (or scheduling request) and receive information transmitted from a base station through periodic monitoring. That is, the connected base station is a base station that may establish the connection with the terminal equipment and transmit and receive data or control information in a restrictive situation. The restrictive situation may establish only the connection, transmit and receive only the control information, or transmit and receive the control information (or data) depending on the periodic transmission (request) of the base station (terminal equipment) or the aperiodic request of the terminal equipment. One terminal equipment may have at least one connection base station. |
| Candidate base station | Common information may be used to make a contention-based resource request (or scheduling request, access request, or the like) and a broadcasting (or multicasting) resource may be used to receive only information transmitted from the base station. |

Even though the serving base station, the connected base station, or the candidate base station is a base station to which another radio access technology (RAT) is applied or a base station to which the same RAT is applied, a radio protocol may be differently configured.

A service provider or a system [or network related controller (for example, O & M) may separately define or control a condition to make a representative control node and perform a representative control node change procedure even between nodes having different RATs. For example, the representative control node may be changed from the LTE system to a wireless local area network (WLAN) (e.g., WiFi AP) system, and vice versa.

The representative control node may be determined in the service provider or the system or may also be determined in the terminal equipment using the user's preference or the measurement result (or collection information) of the terminal equipment. In the representative control node determination, the capability of the terminal equipment, the access (or connection) priority, or the like may be considered.

The setting for the secondary control node may start from the step of performing the connection establishment of the terminal equipment with the representative control node. For example, when the terminal equipment accesses the cell (or base station) belonging to one RAT to perform the connection establishment or after the terminal equipment completes the connection performance, the terminal equipment exchanges information with adjacent nodes to perform the connection establishment as the secondary control node as described above.

By using the procedures, the terminal equipment may secure the continuity of services that is being provided even when the node, the cell, the AP, or the RAT scheme is changed without the handover procedure performed in the mobile communication system based on the existing cellular scheme. Further, the latency required to change the control node may be minimized by using the connection control function for the setting with the plurality of network nodes and maintenance thereof. The connection for the transmission and reception of the packet data is established or re-established by changing the representative control node of the connection control function between the representative control node and the preset secondary control node or the partial or whole activation (or deactivation) operation of the connection control function, thereby securing the continuity of services.

In the procedures of FIGS. 4 and 5, the terminal equipment 402 and 502 may receive the information on the target cell from the serving cell in advance and receive the radio resource information allocated from the target cell to the terminal equipments 402 and 502 in advance. Here, the information on the target cell may include a frequency (or carrier) of the target cell, a cell identifier [for example, global cell identifier (GCI), a physical cell identifier (PCI), a service set identifier (SSID), a basic service set identifier (BSSID), a homogeneous extended service set identifier (HESSID), or the like], a bandwidth, version information, synchronous (or timing) information, or the like. Further, the radio resource information allocated from the target cell may include a radio resource for performing a scheduling identifier, a random access, or an uplink transmission in the target cell, system information of the target cell, physical layer channel configuration information, or the like.

In the step of establishing the first connection with the serving cell or starting the service provision, the terminal equipments 402 and 502 may receive the information on the target cell and the radio resource information allocated from the target cell to the terminal equipments 402 and 502. Further, the terminal equipments 402 and 502 may receive the information on the target cell in advance while receiving the service from the serving cell.

Therefore, the terminal equipments 402 and 502 may receive the control message from the target cell or perform the operation of the uplink transmission to the target cell when meeting the cell change (or cell switching) condition depending on the procedures of FIG. 4 or 5.

Further, the procedures of FIGS. 4 and 5 are described about the terminal equipment moving along a road, but the above procedures are also applied to terminal equipment that is deployed a train moving along a track, an unmanned aerial vehicle moving along a flight path, or the like or user equipment in a transportation means to notify the cell change.

Further, all procedures FIG. 4 are not required to notify the cell change but only the control message of some steps may be selectively used to transmit the cell change information to the terminal equipment.

When a user with user terminal equipment gets in/out a transportation means such as an airplane, a train, a subway, a bus, other vehicles, or the like that are moving, there is a need to immediately perform the cell selection and reselection operation. The existing LTE system may perform the new cell selection and reselection operation when meeting the predetermined conditions (e.g., TreselectionRAT timer). However, when a user with a user terminal equipment gets in/out a transportation means in which a mobile communication system such as LTE/LTE-A or a wireless communication network such as WiFi is deployed, there is a need to perform the new cell selection and reselection operation to release services using the corresponding wireless node or services from the corresponding wireless node.

For example, the user terminal equipment with a settlement function (e.g., transportation card) may recognize the situation in which the user gets in/out the transportation means based on the settlement function. That is, when the user gets in/out the transportation means, if the terminal equipment performs the settlement function operation of the corresponding transportation means, the terminal equipment may recognize the situation in which the user gets in/out the corresponding transportation means. Therefore, when satisfying the predetermined conditions (e.g., TreselectionRAT timer) like the existing LTE system, the terminal equipment does not perform the new cell selection and reselection operation but performs only the settlement function operation to perform a control to perform the new cell selection and reselection operation.

When a user gets in the transportation means, the terminal equipment may be set to search the AP of the wireless local area network (WLAN) (WiFi) deployed in the corresponding transportation means, the small cell of the mobile communication system such as LTE/LTE-A, or a moving cell or perform the cell selection and reselection operation.

Further, when the user gets out the transportation means, the terminal equipment may be set to perform the selection and reselection operation on the network node specialized fro the cell of the mobile communication system such as LTE/LTE-A or stops of the corresponding transportation means, a terminal.

Further, the function of activating or deactivating the new cell selection and reselection operation performance function may be additionally set by performing only the settlement function operation of the terminal equipment. That is, when the new cell selection and reselection operation performance function is deactivated depending on the settlement function operation of the terminal equipment, if meeting the predetermined conditions (e.g., TreselectionRAT timer) like the existing LTE system, the new cell selection and reselection operation is performed and the new cell selection and reselection operation is not performed only by the settlement function operation of the terminal equipment.

Further, the procedures of FIGS. 4 and 5 may be applied a procedure of adding a cell, not the procedure of changing a cell. That is, the procedures of FIGS. 4 and 5 may be applied the procedure of performing the connection establishment with a plurality of cells in the viewpoint of the signaling of the control plane for the terminal equipment to add a cell to thereby maintain the continuity of the control signaling under the moving environment. When the connection with the plurality of cells is established in the viewpoint of the control signaling, the plurality of cells may serve as the representative control node and the secondary control node described above. One of the connection-established cells may perform the function of the representative control node and the rest cells may perform the function of the secondary control node.

Therefore, in the case of the procedure of adding a cell for the connection establishment with the plurality of cells for the control signaling, in the description of each step of FIGS. 4 and 5, the "cell change" may be replaced by the "cell add". For example, in step S408 of FIG. 4, the cell change request message transmitted to the cell 2 403 by the cell 1 401 may also be a cell add request message, not the cell change. In this case, the messages of the steps S414, S416, and S418 may correspond to the cell add notification control message. In the case of the procedure of adding a cell, if the corresponding procedure is completed, to maintain the continuity of the control signaling, the terminal equipment 402 establishes the connection with both of the cell 1 401 and the cell 2 403 in the viewpoint of the control signaling.

Even in the case of FIG. 5, step S504 is a procedure of determining whether a cell is added and in step S512, the cell change notification control message transmitted to the cell 1 501 by the cell 2 503 may be a cell add notification control message, not the cell change. In the case of the procedure of adding a cell, the step S516 of FIG. 5 may not be performed. In the case of the procedure of adding a cell, if the corresponding procedure is completed, to maintain the continuity of the control signaling, the terminal equipment 502 establishes the connection with both of the cell 1 501 and the cell 2 503 in the viewpoint of the control signaling.

Further, in the procedure of FIGS. 4 and 5, all the steps need not be performed but each step may be selectively performed. For example, the step S414 of FIG. 4 and the step S514 of FIG. 5 may be selectively omitted depending on the setting of the system.

As described above, when the service areas of the plurality of cells overlaps with each other or for the special area, cells of the corresponding area (or district) may allocate the radio resources to the terminal equipment in co-ordination or allocate the same radio resource [or (common) radio resource] and operate it. For example, in the specific area in which the wireless communication system providing the mobility function is deployed, a plurality of base stations may allocate the radio resources to the terminal equipment in co-ordination or allocate the same radio resource (or common radio resource) and operate it. Here, the specific area means the area where the service areas of the plurality of base stations overlap with each other, a special area (e.g., crossroad, joining/branch points on the moving path, or the like), an area (or service area) of a predetermined range that is separately managed (or controlled) by a system, or the like.

For the plurality of base stations located in the specific area, to improve the system performance along with the efficient control for the terminal equipment (s), a plurality of base stations (or cells) within the corresponding area may use a method for sharing (or transmitting) common information or allocating the same radio resource.

The common information that are shared by the plurality of base stations (or cells) or transmitted by the plurality of base station using the common radio resource in the corresponding area may be at least one of system information, physical layer channel configuration and allocation information, common control information, radio resource allocation (or configuration) information for a control channel, a resource for access procedure operation, configuration information (or allocation information) of resources for resource request (or scheduling request) procedure performance, a downlink transmission request resource, a reference signal configuration and allocation information, a radio resource [for example, communication resource pool or discovery resource pool] for device-to-device communication, and radio resource information for control signal transmission for device-to-device communication.

As described above, when the radio resource is allocated in co-ordination or the common radio resource (or common resource) is used, the information on the state of the moving path, the density of the terminal equipment, the moving speed of the terminal equipment, or the like is exchanged between the base stations to control the radio resource allocation managed in co-ordination. The control may be made over time or by an aperiodic (or event triggering) method and the conditions for the aperiodic method may be separately set. Therefore, when meeting the conditions for the aperiodic method, the base station, the terminal equipment (or RSU, relay node), or the like may request the allocation control of the radio resource managed in co-ordination or trigger the allocation change.

The transmission method using the common radio resource (or common resource) may be applied to the entire system or restrictively applied to the specific area. That is, the plurality of base stations may transmit the common information as the same radio resource or the individual base station may use different radio resources to transmit the common information of the same content. If the common information is not applied to the entire system but applied to the base stations (or cells) belonging to the specific (or predetermined) area, the common information may include an identifier for identifying the corresponding area. That is, the common information is valid only in the base station (s) within the area where identifiers for identifying an area are the same. Therefore, the terminal equipment may determine based on the corresponding identifier whether the common information can be applied to the base station in the step of trying an access or selecting or reselecting a cell using the identifier that may identify an area.

When the identifier for identifying an area within the common information and the identifier for differentiating the area of the base station that the terminal equipment tries to access or in which the terminal equipment performs the cell selection or the cell reselection are different from each other, the common information may not be applied. Therefore, the terminal equipment needs to newly acquire the common information of the corresponding area (or base station).

Here, the radio resource may consist of parameters on a frequency base such as a central frequency, a system bandwidth, and a subcarrier and parameters on a time base depending on a transmit (or receive) time (or period, section, window) unit such as radio frame, subframe, TTI, and symbol. Further, the radio resource means a configuration of a radio resource to which a hopping pattern of the radio resource, a beam forming technique (e.g., beam configuration information, beam index) using a plurality of antennas, or code sequence (or bit string, signal sequence) characteristics are applied.

The common information is commonly (or identically) applied to the entire system to which the method for transmitting a common radio resource and all the base stations within a specific area.

Figure 6:
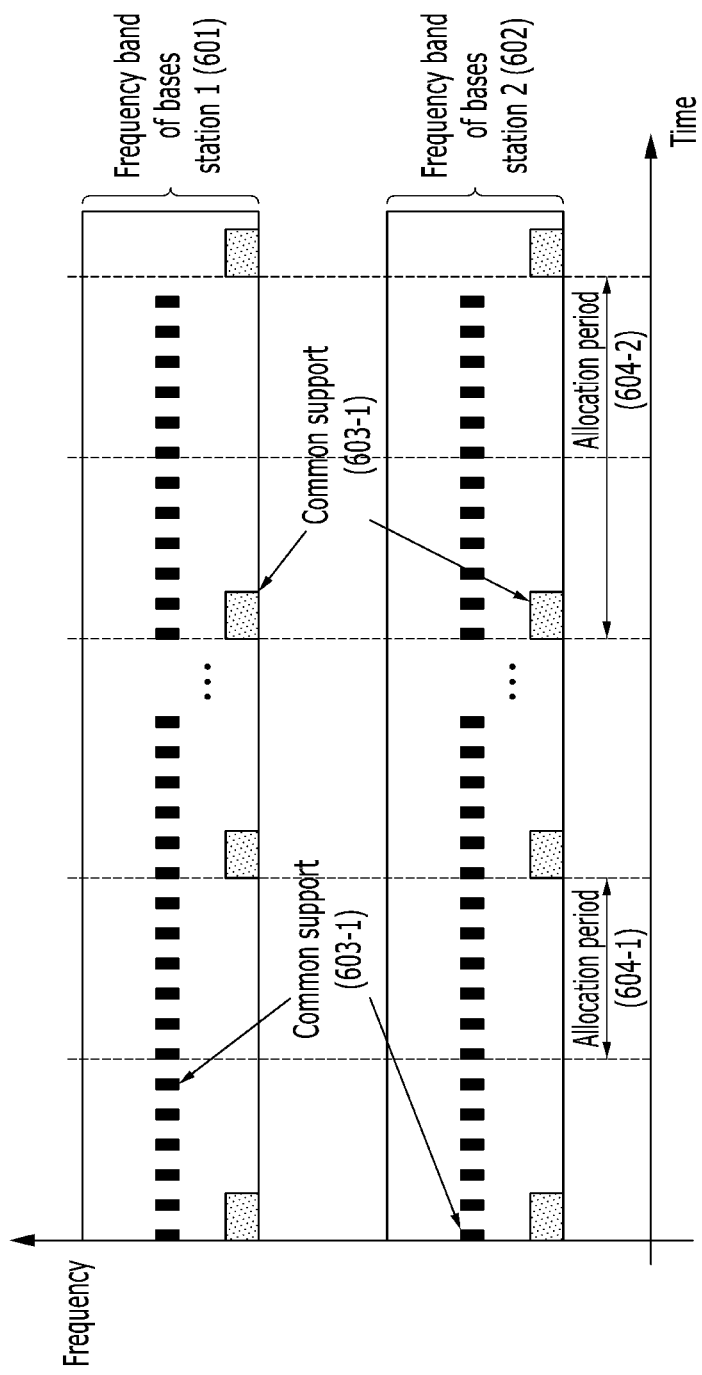
FIGS. 6 and 7 each are diagrams illustrating an example of resource allocation for a common radio resource transmission in a plurality of base stations according to an exemplary embodiment of the present invention.
Figure 7:
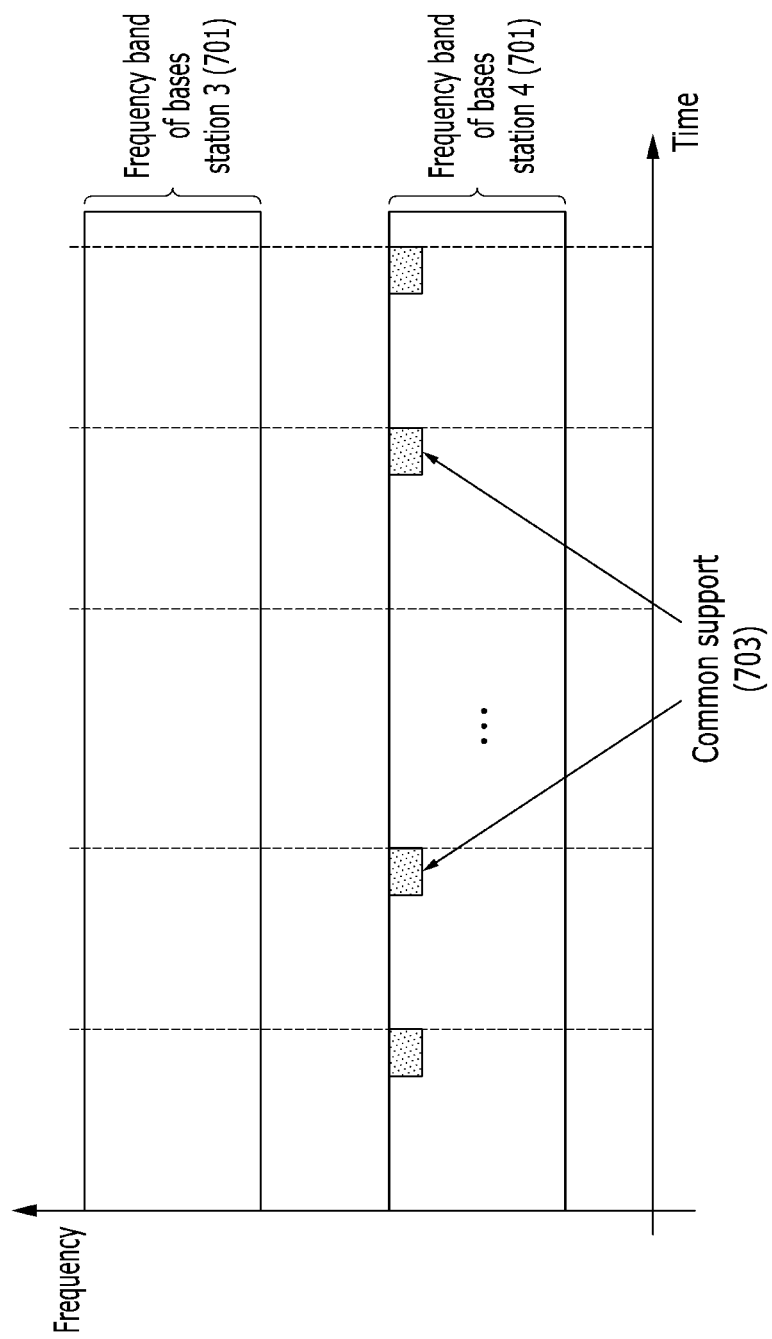

FIGS. 6 and 7 each are diagrams illustrating an example of resource allocation for a common radio resource transmission in a plurality of base stations according to an exemplary embodiment of the present invention.

Referring to FIGS. 6 and 7, the base stations each use the allocated frequency band to provide services.

For example, as illustrated in FIG. 6, base station 1 may use a frequency band 601 to provide a services and base station 2 may use a frequency band 602 to provide services. In this case, at least one common resource 603-1 and 603-2 may be allocated to each frequency band 601 and 602. The common resources 603-1 and 603-2 may have different patterns and different allocation periods 604-1 and 604-2 depending on attributes of the common resources 603-1 and 603-2.

Unlike this, as illustrated in FIG. 7, when base station 3 uses a frequency band 701 to provide services and base station 4 uses a frequency band 702 to provide services, a common resource 703 for the base station 3 and the base station 4 may be allocated depending on an allocation period 704 of the corresponding common resource 703 using the frequency band 702 of the base station 4.

The common resource allocation information may be configured to include an allocation pattern (or radio resource location information) and allocation periods 604-1, 604-2, and 704 for the common resources 603-1, 603-2, and 703. The allocation periods 604-1, 604-2, and 704 of the common resources 603-1, 603-2, and 703 may consist of a multiple of a minimum scheduling (or resource allocation) period or an absolute time unit that is defined in a system. For example, the allocation periods 604-1, 604-2, and 704 of the common resources 603-1, 603-2, and 703 are set to be a multiple of symbol when a minimum scheduling period is a symbol unit and are set to be a multiple of the corresponding transmission interval when the minimum scheduling period is a transmission interval. The allocation periods 604-1, 604-2, and 704 of the common resources 603-1, 603-2, and 703 consist of the absolute time unit, it may be set in a microsecond, millisecond, second, minute unit, or the like.

Further, the common resource allocation information may be transmitted to the terminal by the base station using system information or separate control signaling information.

As illustrated in FIGS. 6 and 7, when the common resource is allocated to transmit the common radio resource, the common resources 603-1, 603-2, and 703 may be configured (or allocated) by being identified depending on the content (or attribute) of the common information. For example, the common resource for the random access resource, the common resource for the resource allocation request, or the common resource for the downlink transmission request may each be allocated or configured separately. However, the plurality of base stations configures the each common resource as a separate resource depending on the attributes of the common information but configures the common resource having the same attributes as the same resource.

Therefore, as illustrated in FIGS. 6 and 7, when the common resource is allocated, the terminal equipment may acquire the allocation (or configuration) information on the common resources 603-1 and 603-2 from the frequency band 601 of the base station 1 through the system information or the separate signaling message. Further, when the corresponding terminal equipment is in the service area of the base station 2, the terminal equipment performs the corresponding procedure (e.g., random access procedure, resource allocation request, downlink transmission request procedure, or the like) on the common resources 603-1 or 603-2 of the frequency band of the base station 2 or receive the information transmitted as the common resource, independent of whether the terminal equipment is established the connection with the base station 2 or the connected state with the corresponding terminal equipment.

In this process, the terminal equipment acquiring the allocation (or configuration) information on the common resources 603-1 and 603-2 from the base station 1 in advance may omit the procedure for acquiring the allocation information on the common resources 603-1 and 603-2 in the frequency band of the base station 2, or the like. However, the terminal equipment may perform the procedure depending on the attributes of the common information such as the random access procedure, the resource allocation request, and the downlink transmission request procedure using the allocation information of the common resources 603-1 and 603-2 acquired in the frequency band 601 of the base station 1 only by receiving the partial system information or the common information from the base station 2 depending on the system configuration or the previous configuration or may receive the common information transmitted as the common resource on the downlink.

By the same method, the terminal equipment acquiring the allocation information of the common resource 703 in the frequency band 702 of the base station 4 may perform the random access procedure, the resource allocation request, the downlink transmission request procedure, or the like for the frequency band 702 of the base station 3 using the corresponding common resource 703 or may receive the information of the base station 3 transmitted as the corresponding common resource. In this case, the operation of the terminal equipment may perform the described operation independent of whether the terminal equipment is established the connection with the base station 3 or the connected state with the corresponding terminal equipment The examples of the common resource allocation of FIGS. 6 and 7 need not be identified depending on the downlink, the uplink, a side link, or the like. That is, the examples show that the common resources 603-1, 603-2, and 703 that the plurality of base stations allocates in co-ordination and may transmit without identifying the downlink from the base station to the terminal equipment, the uplink from the terminal equipment to the base station, the side link for device-to-device communication may be allocated on the frequency base and/or the time base. Therefore, the common resources of FIGS. 6 and 7 illustrate the examples of the allocation of the common resources on the downlink, the uplink, or the side link.

For example, in the case of the downlink, at least one of the system information, the physical layer channel configuration and allocation information, the common control information, the radio resource allocation (or configuration) information, the reference signal configuration and allocation information, the radio resource (e.g., communication resource pool or discovery resource pool) for device-to-device communication, and the radio resource information for the control signal transmission for device-to-device communication may be transmitted using the common resource allocated as illustrated in FIGS. 6 and 7.

In the case of the uplink, the access procedure, the resource request procedure, or the downlink transmission request procedure may be performed using the common resource allocated as illustrated in FIGS. 6 and 7.

Further, in the case of the side link, at least one of the reference signal configuration and allocation information, the radio resource (e.g., communication resource pool or discovery resource pool) for device-to-device communication, and the radio resource information for the control signal transmission for device-to-device communication may be transmitted using the allocated common resource as illustrated in FIGS. 6 and 7.

Hereinafter, the allocation method on the frequency base (or axis) and/or the allocation method on the time base (or axis) will be described. That is, the method using along with the allocation method on the frequency base and the time base described to be below and the method separately using the allocation method on the frequency base or the time base may be possible.

When the content of the allocation information on the common resource is the random access resource, the resource allocation request resource, or the downlink transmission request resource information, the plurality of base stations identically configures the random access, the resource allocation request, or the radio resource for the downlink transmission request that the terminal equipment transmits to the base station. Identically configuring the radio resources by the plurality of base stations may mean absolutely identically configuring the radio resources or relatively identically configuring the radio resources.

Absolutely identically configuring the radio resources means a method for setting the same value (or range) in specifying and designating the allocation location (or index) of a subcarrier within the system bandwidths 601 and 602 of FIG. 6 and 702 of FIG. 7 of the base station, a specific location of the time base configuration unit (for example, frame, subframe, TTI, symbol, or the like) of the radio resource, a transmit (or receive) time (or period, duration, window) value, an identifier (or index) of a radio resource hopping pattern, a beam forming technique (beam configuration, beam index, or the like), an index of a code sequence (or bit string, signal sequence), or the like.

Relatively identically configuring the radio resources is a method for relatively setting the parameters using reference information and offset value. For example, relatively identically configuring the radio resources is a method is a method for allowing the terminal equipment to recognize (or derive) the radio resource allocation information for the random access resource, the resource allocation request resource, the downlink transmission request resource, or the like in the changed base station using the reference information and the offset value for the common resource allocation previously acquired, even though the base station is changed. For example, a method for setting allocation locations of subcarriers for common resources within the system bandwidths 601 and 602 of FIG. 6 and 702 of FIG. 7 of the base station to be subcarriers from x-th to y-th based on the reference information (center, highest subcarrier, or lowest subcarrier) or setting the allocation location using a modular operation may be used. However, x and y may be a natural number starting from 0, an integer, a real number, or the like.

Further, the time base configuration unit (for example, frame, subframe, TTI, slot, mini slot, symbol, or the like) of the radio resource configuring the common resource allocation information, the identifier (or index) of the hopping patter, the beam forming technique (or beam index), or parameters such as the index of the code sequence (or bit string, signal sequence), the transmit (or receive) time (or period, duration, window), or the like may also be set to be acquired (or derived) from x-th to y-th based on the reference information or the modular operation. The reference information of the time base configuration unit of the common resource or the transmit (or receive) time (or period, duration, window) may be set to designate parameter values and a range using values (or index) such as a system frame number (SFN), a radio frame, the subframe, TTI, slot, mini slot, and a symbol or to be acquired using the modular operation.

An operator for the modular operation may use the identifier of the base station, the system bandwidth, a fast Fourier transform (FFT) size, the number (or value) of subcarriers, the number (or value) of SFN frames (or subframe, slot, mini slot, symbol), an index of a scramble (or masking) sequence (or signal sequence) for identifying the base station (or base station group), or the like.

According to the above-mentioned method, the terminal equipment receiving the common information may perform the random access, the resource allocation request, or the downlink transmission request procedure in the changed base station using the random access resource on the common information acquired before the base station is changed, the resource allocation request resource, or the downlink transmission request resource information even when the coverage of the base station is changed due to the movement. That is, the terminal equipment may perform the random access, the resource allocation request, or the downlink transmission request procedure in the changed base station using the common information acquired before the base station is changed, without receiving the common information or the system information valid for the corresponding base station from the corresponding base station.

The downlink transmission request procedure means the transmission procedure from the terminal equipment to the base station to request the required information from the base station. Here, the required information means update information of essential software of the terminal equipment like firmware, or the like, information required for the function operation (or service) of the terminal equipment, or the like.

The terminal equipment may transmit the control signal requesting the required information transmission using the downlink transmission request resource information within the common information to the base station. The downlink transmission request resource may be configured as other resources depending on the content (or configuration parameter) of the required information. The required information that the terminal equipment may receive using the downlink transmission request resource may include the signaling information like a dedicated control message as well as the common information broadcast like the system information of the existing LTE/LTE-A system. The terminal equipment may separately request the required information using the downlink transmission request resource. That is, the terminal equipment may separately request the required information among the following information.

Physical layer configuration information (band, system frame number (SFN), synchronous channel, reference signal, or the like), Location information and related control information for location based service (LBS), Physical layer channel (data transmission channel, control information transmission channel) configuration information, Configuration/transmission (scheduling) information of system information, Adjacent frequency (or base station) information, Adjacent inter-radio access technology (RAT) information, Broadcast (or multicase) service related information like MBMS (or single cell point to multipoint (SC-PTM)), Physical layer configuration (or resource allocation) related information for specific function such as device-to-device communication (or Iot, vehicle communication)

Traffic information, navigation related information for self-driving function support, or the like, or Information for mobility function support such as handover For example, when the downlink transmission request resource consist of the specific code sequence (or signal sequence, bit string), the corresponding code sequence may have a mapping relationship to correspond to the radio resource allocation information or correspond to the content of the required information. Here, the radio resource allocation information means the beam configuration information such as the subcarrier index on the frequency base, the index information of the configuration unit (frame, subframe, slot, mini slot, symbol, or the like) on the time base, and the beam index by the beam forming technique.

As such, the downlink transmission request resource using the code sequence may allocate some of the random access resources for the same purpose and may be replaced. That is, the base station may identify the random access radio resource depending on the required request information, transmit the mapping information of the random access radio resource to the content of the required request information using the common information according to the method for transmitting a common radio resource, transmit it in the system information form, or transmit it through the separate control message. Identifying the random access radio resource means having the mapping relationship among the radio resource area [subcarrier index on the frequency base or index in a configuration unit (frame, subframe, slot, mini slot, symbol, or the like) on the time base] for the random access and the random access preamble (or sequence, signature, or the like) and the required information.

As another method, there is a method for configuring a downlink transmission request resource using parameters configuring a physical layer control channel or a control channel over an MAC or upper layer, not using a code sequence. In this case, the mapping relationship depending on bit (or symbol) information of a control field configuring the corresponding parameter and the content of the required information may also be configured. That is, the downlink transmission request resource to allow the terminal equipment to request the required information may be configured in some forms (e.g., field parameter) of the parameters configuring the physical layer control channel. Further, when the required information request is started (or tried, triggered) using the control signaling over the MAC or upper layer or the random access procedure, it is possible to signal what information the terminal equipment requires by using the control message of the MAC layer or the control message of the RRC layer.

Therefore, the terminal equipment transmits the downlink transmission request resource using the physical layer control channel or the control signaling information (or message) over the MAC or upper layer previously having the mapping relationship depending on the required information. The base station may confirm the received downlink transmission request resource and transmit the mapped information to the corresponding downlink transmission request resource.

If the method for transmitting a common radio resource is restrictively applied to a specific area, the base station may include the identifier for identifying the specific area in the common information, identify the common information of the specific area using the physical layer identifier (or pattern of a reference signal) of the base station, or the like, recognize the common information of the specific area by masking a special code sequence (or signal sequence, bit string) that is geographically different.

Figure 8:
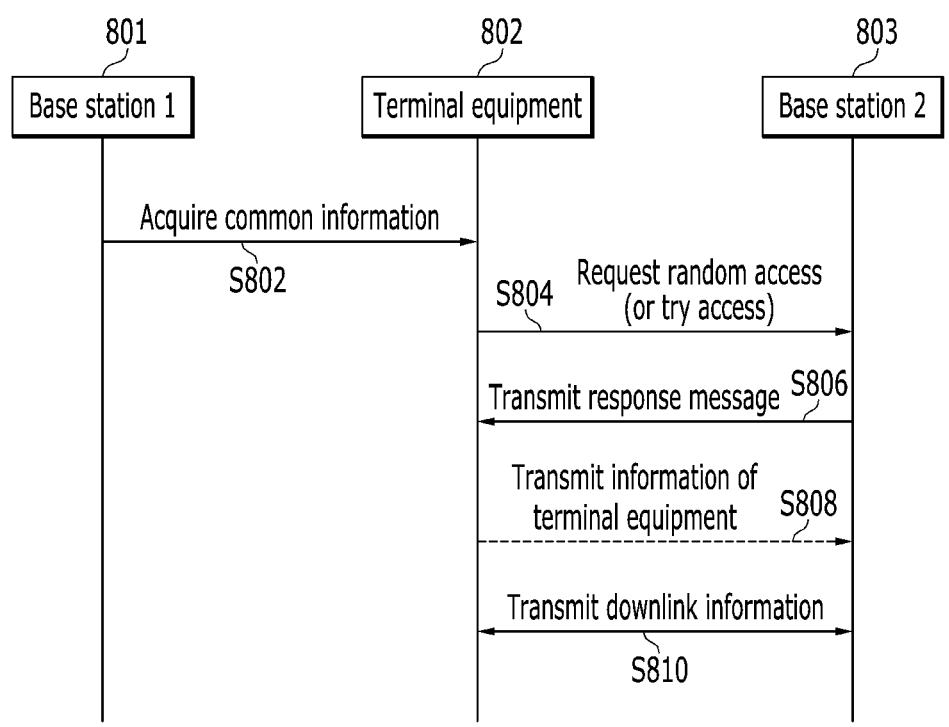
FIG. 8 is a diagram illustrating an example of a procedure of an access control or a common information transmission of terminal equipment according to an exemplary embodiment of the present invention.

FIG. 8 is a diagram illustrating an example of a procedure of an access control or a common information transmission of terminal equipment according to an explanary embodiment of the present invention.

The base station 1 (or cell 1) 801 and the base station 2 (or cell 2) 803 transmit the common information using the method for transmitting a common radio resource in the entire system or the specific area.

The terminal equipment 802 acquires the common information from the base station 1 801 (S802). The common information acquired by the terminal equipment 802 may include the system information commonly applied to the plurality of base stations, the radio resource allocation information on the downlink shared for the control information transmission to a plurality of base stations, the radio resource allocation information on the uplink for the random access, or the radio resource allocation information on the uplink for the downlink transmission request resource, or the like.

That is, the terminal equipment 802 may acquire the system information commonly applied to the base station 1 801 and the base station 2 803 from the base station 1 801. Since the terminal equipment 802 acquires the common resource allocation information (radio resource allocation information on the downlink shared for the control information transmission to the plurality of base stations) from the base station 801, the terminal equipment 802 may omit the reception of the system information of the base station 2 802 or acquire the radio resource configuration information of the base station 2 802 by receiving only some partial of the system information. The radio resource configuration information may include the transmission frequency of the physical layer, the system bandwidth, the beam information (beam width, beam index, or the like) by the beam forming technique, variable configuration information such as the reference value, the offset value, or the like on the frequency base or the time base configuring the radio resource, or information on the radio resource area (or section) that is not used or deactivated.

Further, the terminal equipment 802 may transmit the random access request (or access try) to the base station 2 803 or perform the downlink transmission resource request, using the radio resource allocation (or configuration) information of the random access resource (or downlink transmission request resource) acquired from the base station 1 801 (S804). The base station 2 803 may transmit the response message to the random access request (or access try) (S806). Further, when for the downlink transmission resource request, the base station 2 803 may identify what the required information the terminal equipment 802 requests is using only the downlink transmission request resource (or random access resource) transmitted by the terminal equipment 802, the base station 2 803 may transmit the corresponding required information in step S806.

Identifying what the required information by the terminal equipment 802 requests means, by the base station 2 803, identifying whether the required information is the system information transmission request depending on the on-demand of the terminal equipment 802, the required information is the downlink data transmission request like the update of firmware or essential software of the terminal equipment 802, the required information is the uplink resource allocation request, or the like based on only the control information [for example, preamble index for the random access, index of a specific signal sequence (or signature, or the like) for the uplink resource request, or a specific field value of the uplink control channel, or the like] that is transmitted from the terminal equipment 802 in step S804.

The system information transmission depending on the on-demand of the terminal equipment 802 means transmitting, by the base station 2 803, only the corresponding system information requested by the terminal equipment 802 by identifying the essential system information like the master information block (MIB) of the LTE system or the minimum system information, the scheduling information (e.g., SIB1 of the LTE system) of the system information block, the configuration information (e.g, SIB2 of the LTE system) of the physical layer channel of the corresponding base station, the system information depending on the support function [for example, multimedia broadcast and multicast service (MBMS), device to device (D2D), machine type communication/internet of thing (MTC/Iot), vehicle to everything (V2X), alarm transmission for a disaster/catastrophe and social safety network, location and common time information, interworking with other RAT systems, or the like], the updated system information, or the like.

The terminal equipment 802 receiving the response message from the base station 803 in step S806 transmits the information [for example, terminal identifier, capability, attribute, or information on moving state, location, or the like] of the terminal equipment 802 to the base station 2 803 (S808).

Further, in the step S808, the terminal equipment 802 may transmit the control information identifying the content of the information to be received from the downlink of the base station 2 803. However, the step S808 may also be performed selectively. For example, only when the base station 2 803 may not identify what the required information the terminal equipment 802 requests is based on only the downlink transmission request resource (or random access resource) transmitted from the terminal equipment 802 in the step S804 or the additional control information is required, the terminal equipment 802 may selectively transmit the corresponding control information in the step S808.

The base station 2 803 may transmit the downlink information requested from the terminal equipment 802 and the terminal equipment 802 may receive the requested downlink information (S810).

Further, in the step S806, the base station 2 803 may transmit the scheduling information for the radio resource of the step S810. The scheduling information may include the identifier of the base station 2 803 transmitting the corresponding information, the beam index, the identifier for identifying the corresponding information, the radio resource allocation information, the modulation and encoding information, the allocation information of the ACK/NACK resource for transmitting the feedback information to notify whether the corresponding information is successfully received. In this case, the radio resource allocation information may include the corresponding information transmission band on the frequency base, the transmitted subcarrier allocation information, the allocation information in the radio resource configuration unit (frame, subframe, slot, mini slot, symbol) on the time base, the information on the transmission time, the transmission section, or the like.

Further, the step S808 and the step S801 may be performed by another base station, for example, the base station 3 (not illustrated). That is, the terminal equipment 802 may perform the steps S804 and S806 along with the base station 2 803 and may perform the steps S808 and S810 along with the base station 3. In this case, the base station 3 may be a base station applying the RAT different from the base station 2 803 or the base station 1 801, a base station having different transmission carrier or system bandwidth, or a base station having different layer configuration of wireless protocol. However, the base station 1 801, the base station 2 803, and the base station 3 are the base stations (or cell, TRP) transmitting the common information using the method for transmitting a common radio resource in the entire system or a specific area. The terminal equipment 802 may perform an access to another base station or receive the required information using the common information acquired from the base station 1 801, the base station 2 803, and the base station 3.

Although the reception method or procedure of the terminal equipment (or base station) corresponding to the transmission method or procedure of the base station (or terminal equipment) according to the present invention described above is not separately described, they are included in the scope of the present invention.

According to an exemplary embodiment of the present invention, it is possible to provide a mobile communication function capable of minimizing the latency of the mobility control and the wireless section access procedure for the terminal equipment deployed in the moving object or the terminal equipment in the moving object that is moving along the set path based on the mobile communication system and effectively constructing the self driving and the intelligent traffic system.

The exemplary embodiments of the present invention are not implemented only by the apparatus and/or method as described above, but may be implemented by programs realizing the functions corresponding to the configuration of the exemplary embodiments of the present invention or a recording medium recorded with the programs, which may be readily implemented by a person having ordinary skill in the art to which the present invention pertains from the description of the foregoing exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for receiving system information by terminal, the method comprising:
receiving first system information from a first base station among the plurality of base stations, wherein the first system information includes a first area identifier for identifying a first predetermined area to which the first base station belongs;
receiving, from the first base station, a first area-specific system information block (SIB) which is valid for the first predetermined area and a first cell-specific SIB which is valid for a cell served by the first base station;
receiving second system information from a second base station among the plurality of base stations, wherein the second system information includes a second area identifier for identifying a second predetermined area to which the second base station belongs;
determining whether the second area identifier is equal to the first area identifier; and
receiving, from the second base station, a second area-specific SIB which is valid for the second predetermined area and a second cell-specific SIB which is valid for a cell served by the second base station when the second area identifier is not equal to the first area identifier, or receiving the second cell-specific SIB and no second area-specific SIB from the second base station when the second area identifier is equal to the first area identifier.

2. The method of claim 1, further comprising:
requesting the second cell-specific SIB through a random access message to the second base station when the second area identifier is equal to the first area identifier.

3. The method of claim 2,
wherein the random access message is transmitted to the second base station by using an uplink resource included in the first area-specific SIB or the first cell-specific SIB.

4. The method of claim 1, further comprising:
requesting the second area-specific SIB and the second cell-specific SIB through a random access message to the second base station when the second area identifier is not equal to the first area identifier.

5. The method of claim 1,
wherein the second area-specific SIB includes system information according to a support function of at least one of Multimedia Broadcast Multicast Service (MBMS), Device to Device (D2D), Machine Type Communication (MTC), Internet of Things (IoT), or Vehicle to Everything (V2X).

6. The method of claim 1,
wherein the second area-specific SIB includes an updated SIB in the second base station.

7. A method for transmitting system information to a terminal by a base station,
transmitting system information to the terminal, wherein the system information includes a first area identifier for identifying a first predetermined area to which the base station belongs;
receiving a random access message from the terminal; and
transmitting, to the terminal, at least one system information block (SIB) requested through a system information request included in the random access message, wherein the system information request is determined by the terminal based on whether the first area identifier is equal to a second area identifier of an adjacent base station,
wherein the transmitting, to the terminal, at least one SIB requested through a system information request included in the random access message includes:
transmitting a first cell-specific SIB which is valid for a cell served by the base station to the terminal when the system information request is determined based on that the first area identifier is equal to the second area identifier; or
transmitting a first area-specific SIB which is valid for the first predetermined area and the first cell-specific SIB to the terminal when the system information request is determined based on that the first area identifier is not equal to the second area identifier.

8. The method of claim 7,
wherein the first area-specific SIB includes system information according to a support function of at least one of Multimedia Broadcast Multicast Service (MBMS), Device to Device (D2D), Machine Type Communication (MTC), Internet of Things (IoT), or Vehicle to Everything (V2X).

9. The method according to claim 7,
wherein the first area-specific SIB includes an updated SIB in the base station.

10. The method of claim 7,
wherein the receiving of the random access message from the terminal comprises
receiving the random access message from the terminal through an uplink resource indicated by system information of the adjacent base station.

11. A terminal for receiving system information,
a processor, a memory, and a wireless communication unit,
wherein the processor executes a program stored in the memory to perform:
receiving first system information from a first base station among the plurality of base stations by using the wireless communication unit, wherein the first system information includes a first area identifier for identifying a first predetermined area to which the first base station belongs;
receiving, from the first base station, a first area-specific system information block (SIB) which is valid for the first predetermined area and a first cell-specific SIB which is valid for a cell served by the first base station by using the wireless communication unit;
receiving paging message including second system information from a second base station among the plurality of base stations by using the wireless communication unit, wherein the second system information includes a second area identifier for identifying a second predetermined area to which the second base station belongs;
determining whether the second area identifier is equal to the first area identifier; and
receiving, from the second base station, a second area-specific SIB which is valid for the second predetermined area and a second cell-specific SIB which is valid for a cell served by the second base station by using the wireless communication unit when the second area identifier is not equal to the first area identifier or receiving the second cell-specific SIB and no second area-specific SIB from the second base station by using the wireless communication unit when the second area identifier is equal to the first area identifier.

12. The terminal of claim 11,
wherein the processor executes the program to further perform
requesting the second cell-specific SIB through a random access message to the second base station by using the wireless communication unit when the second area identifier is equal to the first area identifier.

13. The method of claim 12,
wherein the random access message is transmitted to the second base station by using an uplink resource included in the first area-specific SIB or the first cell-specific SIB.

14. The terminal of claim 11,
wherein the processor executes the program to further perform:
requesting the second area-specific SIB and the second cell-specific SIB through a random access message to the second base station by using the wireless communication unit when the second area identifier is not equal to the first area identifier.

15. The terminal of claim 11,
wherein the second area-specific SIB includes system information according to a support function of at least one of Multimedia Broadcast Multicast Service (MBMS), Device to Device (D2D), Machine Type Communication (MTC), Internet of Things (IoT), or Vehicle to Everything (V2X).

16. The terminal of claim 11,
wherein the second area-specific SIB includes an updated SIB in the second base station.

* * * * *